(12) United States Patent
Orr et al.

(10) Patent No.: US 8,482,520 B2
(45) Date of Patent: Jul. 9, 2013

(54) METHOD FOR TAP DETECTION AND FOR INTERACTING WITH AND A HANDHELD ELECTRONIC DEVICE, AND A HANDHELD ELECTRONIC DEVICE CONFIGURED THEREFOR

(75) Inventors: Kevin Howard Orr, Waterloo (CA); Marc Edward Holbein, Waterloo (CA)

(73) Assignee: Research In Motion Limited, Waterloo (CA)

( * ) Notice: Subject to any disclaimer, the term of this patent is extended or adjusted under 35 U.S.C. 154(b) by 776 days.

(21) Appl. No.: 12/696,136

(22) Filed: Jan. 29, 2010

(65) Prior Publication Data

US 2010/0194682 A1 Aug. 5, 2010

Related U.S. Application Data

(63) Continuation-in-part of application No. 12/362,604, filed on Jan. 30, 2009.

(51) Int. Cl.
*G09G 5/00* (2006.01)

(52) U.S. Cl.
USPC ............................ 345/156; 345/173; 702/141

(58) Field of Classification Search
USPC ........................................................ 345/156
See application file for complete search history.

(56) References Cited

U.S. PATENT DOCUMENTS

| | | | |
|---|---|---|---|
| 6,243,075 B1 | 6/2001 | Fishkin | |
| 6,369,794 B1 * | 4/2002 | Sakurai et al. | 345/156 |
| 2002/0167699 A1 * | 11/2002 | Verplaetse et al. | 359/158 |
| 2003/0184445 A1 * | 10/2003 | Chen et al. | 340/690 |
| 2005/0246109 A1 * | 11/2005 | Bang et al. | 702/41 |
| 2006/0132457 A1 | 6/2006 | Rimas-Ribikauskas et al. | |
| 2007/0070046 A1 | 3/2007 | Sheynblat et al. | |
| 2007/0151772 A1 * | 7/2007 | Wu | 177/25.14 |
| 2007/0213090 A1 | 9/2007 | Holmberg | |
| 2007/0229464 A1 | 10/2007 | Hotelling et al. | |
| 2007/0247429 A1 | 10/2007 | Westerman | |
| 2008/0030479 A1 | 2/2008 | Lowles et al. | |
| 2008/0134010 A1 * | 6/2008 | Roselli et al. | 714/801 |
| 2008/0165140 A1 * | 7/2008 | Christie et al. | 345/173 |
| 2009/0153342 A1 * | 6/2009 | Thorn | 340/669 |
| 2010/0060604 A1 * | 3/2010 | Zwart et al. | 345/173 |
| 2011/0087454 A1 * | 4/2011 | Lee et al. | 702/124 |

FOREIGN PATENT DOCUMENTS

EP 1591873 A2 11/2005

OTHER PUBLICATIONS

Article ID: 305972, "iPhone: Using the Multi-touch Display.", found at www.apple.com, Jul. 9, 2007.

Arnold Kim, "Apple Multi-Touch Display?", found at http://www.macrumors.com/2006/02/14/apple-multi-touch-display/, Feb. 14, 2006.

(Continued)

*Primary Examiner* — Dorothy Harris
(74) *Attorney, Agent, or Firm* — Ridout & Maybee LLP

(57) ABSTRACT

A method for tap detection and for interacting with a handheld electronic device, and a handheld electronic device configured therefore are described. In accordance with one embodiment, there is provided a method for tap detection on a handheld electronic device, comprising: measuring acceleration using an accelerometer of the handheld electronic device; determining when measured acceleration exceeds an upper limit threshold and a lower limit threshold within a predetermined duration of each other; when the upper limit threshold and lower limit threshold have been exceeded, determining a rate of change of acceleration between the upper limit threshold and lower limit threshold and registering a tap input when the rate of change of acceleration exceeds a predetermined tap threshold.

19 Claims, 12 Drawing Sheets

OTHER PUBLICATIONS

Will Park, "Nokia files for Patent application for "no look" touchscreen controls" found at http://www.intomobile.com/2007/10/05/nokia-files-for-patent-application-for-no-look-touchscreen-controls.html;, Oct. 5, 2007.

Will Park, "Sony Ericsson files for patent on programmable touchscreen keypad", found at http://www.intomobile.com/2007/09/14/sony-ericsson-files-for-patent-on-programmable-touchscreen-keypad.html, Sep. 14, 2007.

Will Park, "Apple files patent application for pressure sensitive touchscreen technology", found at http://www.intomobile.com/2007/10/08/apple-files-patent-application-for-pressure-sensitive-touchscreen-technology.html, Oct. 8, 2007.

Office Action, U.S. Appl. No. 12/362,604; Oct. 18, 2012.

* cited by examiner

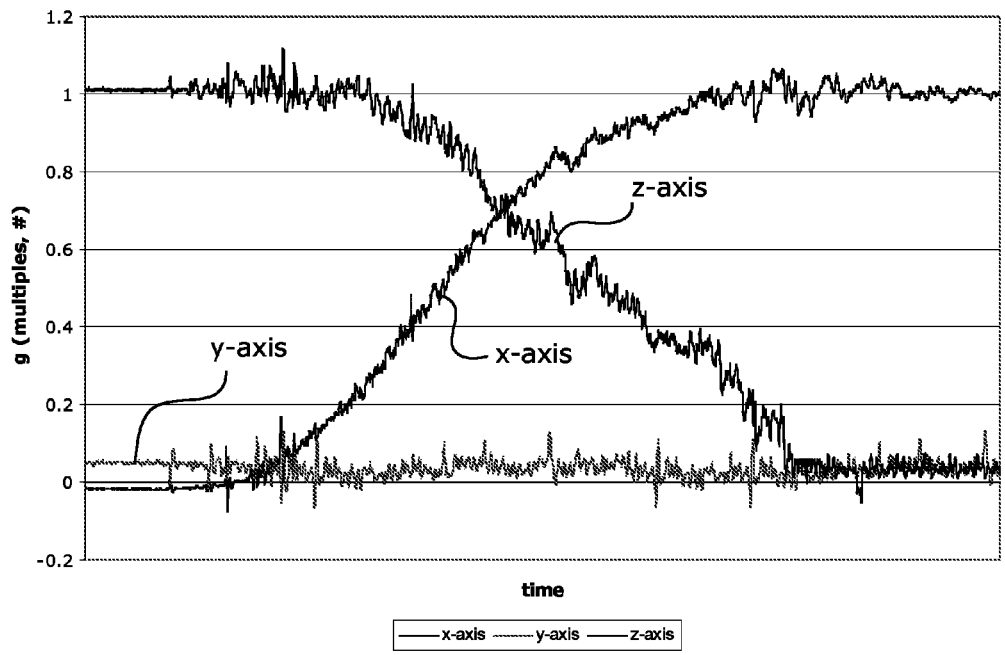
FIG. 11
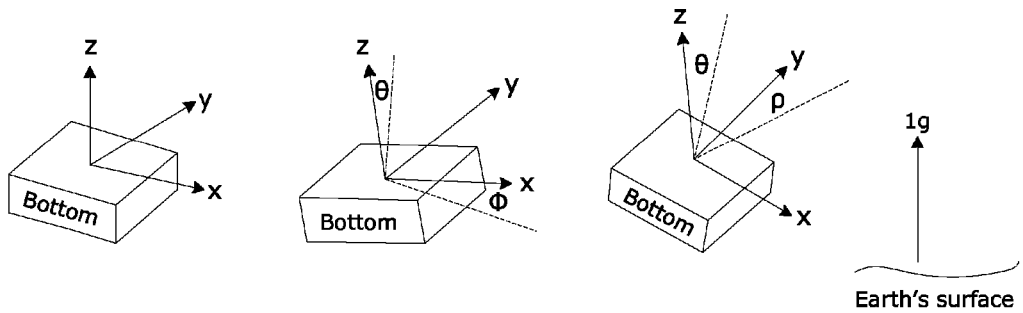
FIG. 12A  FIG. 12B  FIG. 12C

METHOD FOR TAP DETECTION AND FOR INTERACTING WITH AND A HANDHELD ELECTRONIC DEVICE, AND A HANDHELD ELECTRONIC DEVICE CONFIGURED THEREFOR

CROSS-REFERENCE TO RELATED APPLICATIONS

This application is a continuation-in-part of and claims priority to U.S. patent application Ser. No. 12/362,604, filed Jan. 30, 2009, the content of which is incorporated herein by reference.

TECHNICAL FIELD

The present disclosure relates generally to input mechanisms for handheld electronic devices and, more particularly to a method for tap detection and for interacting with a handheld electronic device, and a handheld electronic device configured therefor.

BACKGROUND

Handheld electronic devices such as mobile communications devices are becoming smaller in size while being expected to provide increasingly more functions. Touchscreens on handheld electronic devices provide an intuitive user interface, however incorporating touchscreens into handheld electronic devices also poses challenges. One problem is the small amount of space available to display information for user selection on the touchscreen, particularly when using a finger to make the selections on the touchscreen. For example, sometimes virtual keys/buttons or menu options are situated in close proximity making it difficult to detect the desired input selection. Another problem is that touchscreens tend to be more sensitive to changes in environmental conditions such as temperature and humidity. For capacitive touchscreens, the touchscreen may be unable to detect an input if sufficient capacitance is not available, for example, because the user trying to input with her nails or wearing a glove.

Thus, there remains a need for improved input mechanisms for handheld electronic devices, and in particular an improved handheld electronic device having a touchscreen and an improved method of using a touchscreen of a handheld electronic device.

BRIEF DESCRIPTION OF THE DRAWINGS

FIG. 11 is a graph illustrating example tilt response of an accelerometer;

FIG. 12A to 12C are schematic diagrams illustrating the assignment of pitch and roll vectors of a three-axis digital motion sensor in accordance with an example embodiment of the present disclosure;

Like reference numerals are used in the drawings to denote like elements and features.

DETAILED DESCRIPTION OF EXAMPLE EMBODIMENTS

Figure 1A:
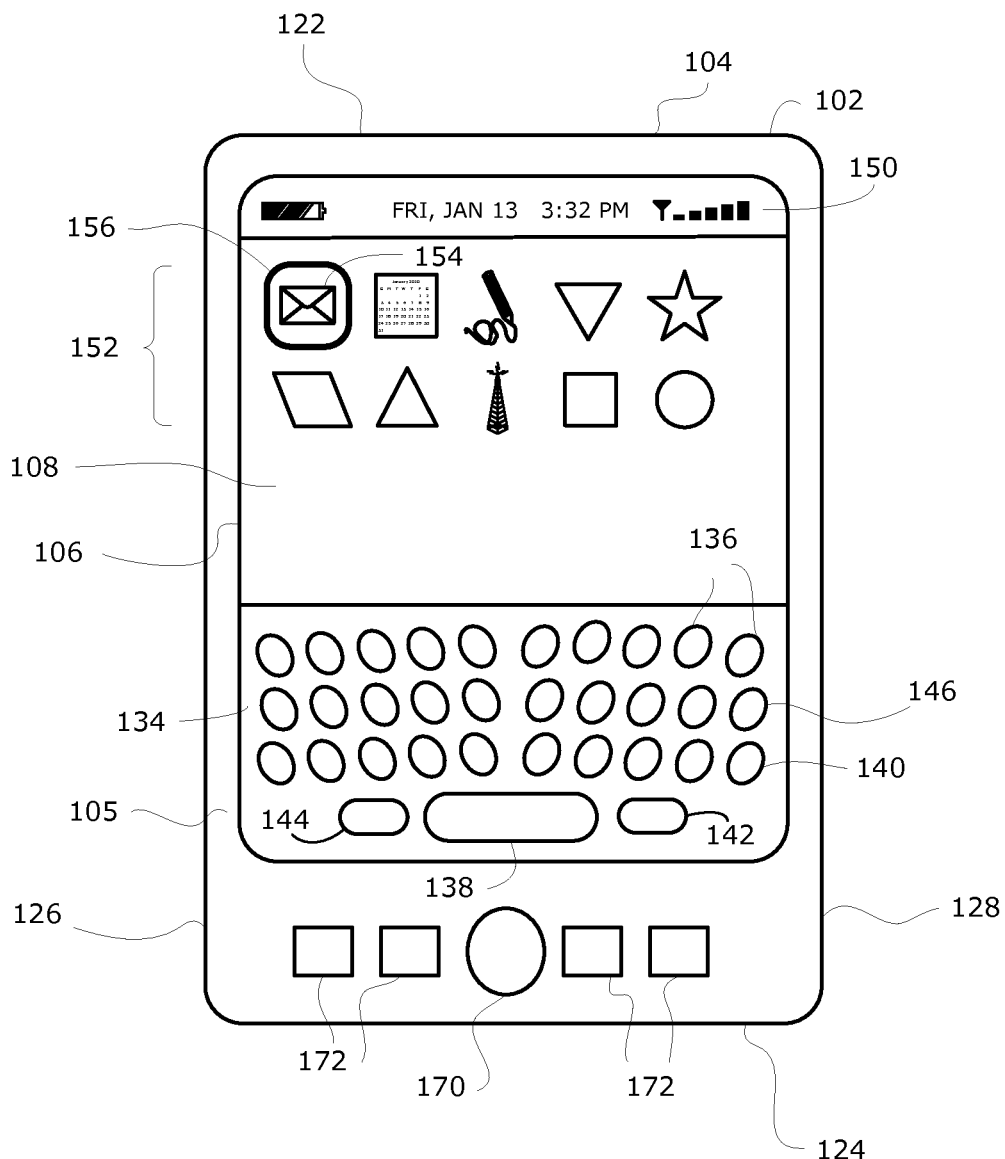
FIG. 1A is a front view of a handheld electronic device having a touchscreen in a virtual keyboard mode in accordance with one embodiment of the present disclosure.

The present disclosure describes a method for tap detection and for interacting with a handheld electronic device, and a handheld electronic device configured therefore. In accordance with one embodiment, there is provided a method for tap detection on a handheld electronic device, comprising: measuring acceleration using an accelerometer of the handheld electronic device; determining when measured acceleration exceeds an upper limit threshold and a lower limit threshold within a predetermined duration of each other; when the upper limit threshold and lower limit threshold have been exceeded, determining a rate of change of acceleration between the upper limit threshold and lower limit threshold and registering a tap input when the rate of change of acceleration exceeds a predetermined tap threshold.

In accordance with another embodiment, there is provided a handheld electronic device, comprising: a processor; an accelerometer connected to the processor for measuring acceleration; the processor being configured for determining when measured acceleration exceeds an upper limit threshold and a lower limit threshold, and when the upper limit threshold and lower limit threshold have been exceeded within a predetermined duration of each other, determining a rate of change of acceleration between the upper limit threshold and lower limit threshold and registering a tap input when the rate of change of acceleration exceeds a predetermined tap threshold.

In accordance with a further embodiment, there is provided an accelerometer, comprising: a sensing element; and a controller connected to the sensing element; the controller being configured for determining when measured acceleration exceeds an upper limit threshold and a lower limit threshold, and when the upper limit threshold and lower limit threshold have been exceeded within a predetermined duration of each other, determining a rate of change of acceleration between the upper limit threshold and lower limit threshold and registering a tap input when the rate of change of acceleration exceeds a predetermined tap threshold. In some embodiments, the tap input is registered only when the upper limit threshold has been exceeded for a first predetermined duration. In some embodiments, the tap input is registered only when the lower limit threshold has been exceeded for a second predetermined duration. In some embodiments, the tap input is registered only when the upper limit threshold has been exceeded for a first predetermined duration and the lower limit threshold has been exceeded for a second predetermined duration. In some embodiments, the tap input is registered when the upper limit threshold has been exceeded within a predetermined duration after which the lower limit threshold is exceeded, or when the lower limit threshold has been exceeded within a predetermined duration after which the upper limit threshold is exceeded. In some embodiments, the upper limit threshold has a magnitude which is larger than the lower limit threshold in a first device orientation, and the lower limit threshold has a magnitude which is larger than the upper limit threshold in a second device orientation.

The present disclosure also describes a handheld electronic device having a touchscreen and a method of using a touchscreen of a handheld electronic device. The handheld electronic device may have one or more both of a keyboard mode and an input verification mode, and may be operable to switch between these modes, for example, based on a respective device setting or user input.

In the keyboard mode, a keyboard user interface element is presented on the touchscreen (referred to as a virtual keyboard). The touchscreen is used to receive touch inputs resulting from the application of a strike force to input surface of the touchscreen. A motion sensor such as an accelerometer is used to detect the magnitude of the strike force. The motion sensor, a motion detection subsystem, or the processor of the handheld electronic device is used to determine the magnitude of a motion signal representing the strike force which is generated by the motion sensor. The amount of force applied to the touchscreen is then used to differentiate between multiple inputs of multifunction virtual keys or buttons of the virtual keyboard.

In some embodiments of the keyboard mode, the handheld electronic device uses a single predetermined strike force threshold for a hard tap to differentiate between a normal tap and a hard tap; however it is contemplated that a strike force threshold or range could be used for both hard taps and normal taps. In other embodiments, the handheld electronic device could be configured to differentiate between more than two types of taps such as, for example, normal, medium-hard and hard taps.

In some embodiments, the predetermined strike force threshold has a value which represents the strike force of a hard tap for a typical device user or which has been calibrated to a particular device user. If the amount of force applied to the touchscreen is greater than or equal to the predetermined strike force threshold, the force is determined to be a hard tap and the input or command associated with a hard tap is selected by the device processor. If the amount of force applied to the touchscreen is less than the predetermined strike force threshold, the force is determined to be a normal tap and the input or command associated with a normal tap is selected by the device processor.

For example, if a number coexists with a letter on a virtual key, a hard tap on the virtual key may input the number whereas a normal tap on the virtual key may input the letter. If two letters coexist on a virtual key, a hard tap on the virtual key may input the second letter in the two letter pair whereas a normal tap on the virtual key may input the first letter in the two letter pair. Depending on the configuration of the handheld electronic device and the virtual keyboards implemented by the device, the logical inputs may be switched so that, for example, if a number coexists with a letter on a virtual key, a normal tap on the virtual key inputs the number rather than the letter, and a hard tap on the virtual key inputs the letter.

This mechanism provides an alternative input mechanism for inputting "secondary" or "alternate" inputs of a multifunction virtual key. In mechanical keyboards, "secondary" inputs of a multifunction key are typically input by pressing an alternate function or input key such as the "SHIFT" or "ALT" key in combination with the desired multifunction key.

The input associated with the primary input/command associated with a normal tap and "secondary" or "alternate" input/command associated with a hard tap may be configurable by the user in some embodiments. In addition, the inputs and/or command associated with at least some of the multifunction keys of the virtual keyboard may be configurable in some embodiments. The concepts described herein may be applied in different ways to provide primary and alternate/secondary functions associated with virtual icons/key/buttons.

In the input verification mode, the accelerometer is used to verify inputs of the touchscreen to improve the accuracy of touchscreen input. Most touchscreen modules report a finger presence or pressure value in a data packet returned to the device microprocessor. The input verification mode may be advantageous for augmenting finger touch contact, for example in capacitive touchscreens. In capacitive touchscreens, a charge change occurs which indicates contact with a fingertip or conductive device such as a conductively tipped stylus. When a fingertip is used to contact the touchscreen, the amount of the capacitive change is typically proportional to the width of the finger contact area (sometimes referred to as the finger touch area or finger touch profile) on the touch-sensitive input surface. Capacitive touchscreen modules such as a touchpad screen using ClearPad™ technology from Synaptics Incorporated report a finger presence in a data packet returned to the device microprocessor. If this value is low (i.e., lower than typical capacitance threshold to indicate finger presence), the touch input may be rejected in a conventional capacitive touchscreen device. It will be appreciated that a charge change in a capacitive touchscreen is just one example of how to determine a touch contact with a touchscreen. The manner in which touch contacts are determined is dependent on the touchscreen technology implemented in a given embodiment. Moreover, input verification mode described herein may be used in any type of touchscreen.

In accordance with the input verification mode of the present disclosure, a tap indication from the touch-sensitive input surface of the touchscreen device is augmented with input from the accelerometer so that a low capacitive reading that would not normally be considered a valid touch input can still indicate a valid touch if the motion detected by the accelerometer exceeds a predetermined strike force threshold. Input verification may assist in use cases where the device user is wearing a glove or using fingernails with low capacitive characteristics and the capacitive reading from a touch input will be lower than a threshold corresponding to a detectable input. For example, input verification may allow a user wearing gloves to respond to prompts such as answering an incoming phone call, alarm or other notification by touching a designated response input area on the touchscreen, particularly if the response area is relatively large. Input verification may also be advantageous when the handheld electronic device is used in challenging environment conditions, for example, when outside of the recommended temperature or humidity ranges affecting the capacitive reading of the touchscreen for the handheld electronic device.

In an input verification mode, a predetermined strike force threshold for a tap is used. The predetermined strike force threshold has a value which represents the strike force of a normal input by a user or which has been calibrated to a particular user. If the accelerometer detects a force which is greater than or equal to the predetermined strike force threshold within a predetermined duration from the touchscreen detecting an external force has been applied (the manner in which this is determined depends on the type of touchscreen which is used), the external force applied to the touchscreen is determined to be a tap. A logical input or command associated with a location of the external force is then selected by the device processor.

In the keyboard mode and input verification mode, the location of the touch input (i.e., external force) is typically supplied by a controller of the touchscreen typically using a centroid calculation based on a contact area. However, the device processor could determine the location of the external force from raw data feed from the touchscreen. If the accelerometer does not detect any force exceeding the predetermined strike force threshold within the predetermined duration from the detection of an external force by the touchscreen, the external force applied to the touchscreen is determined not to be a tap, and no logical input or command is selected by the device processor.

The embodiments described herein generally relate to portable electronic devices such as handheld electronic devices. Examples of portable electronic devices include wireless communication devices such as pagers, cellular phones, Global Positioning System (GPS) navigation devices and other satellite navigation devices, cellular smart-phones, wireless organizers, personal digital assistants and wireless-enabled notebook computers. The portable electronic device may also be a portable electronic device without wireless communication capabilities such as a handheld electronic game device, digital photograph album and digital camera. These examples are intended to be non-limiting. The innovations described herein relating to the differentiation between multiple inputs of a touchscreen using an accelerometer or other motion sensor, and to verify the input of a touchscreen using an accelerometer or other motion sensor, may also be applied outside of the portable electronic device field, for example, in touchscreen-based desktop or portable computers, point-of-sale systems such as retail or restaurant ordering systems, automated teller machines (ATMs) and other electronic kiosks, as well as other "fixed" touchscreen applications such as in industrial machinery. A host device may have a touchscreen operated in accordance with the present disclosure as well as a mechanical keyboard, the touchscreen control of the present disclosure being used to verify input or select an alternate function of, for example, an icon on the touchscreen or double-clicking.

General Device Construction

Figure 1B:
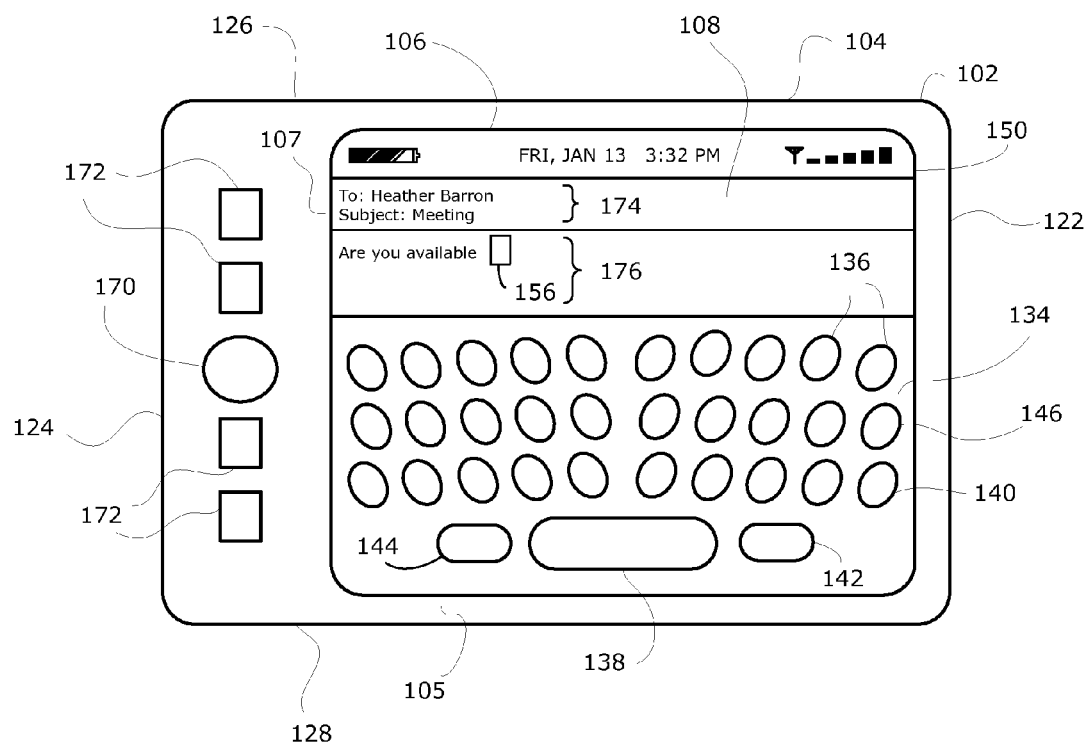
FIG. 1B is a front view of a handheld electronic device having a touchscreen in a virtual keyboard mode in accordance with another embodiment of the present disclosure.
Figure 2:
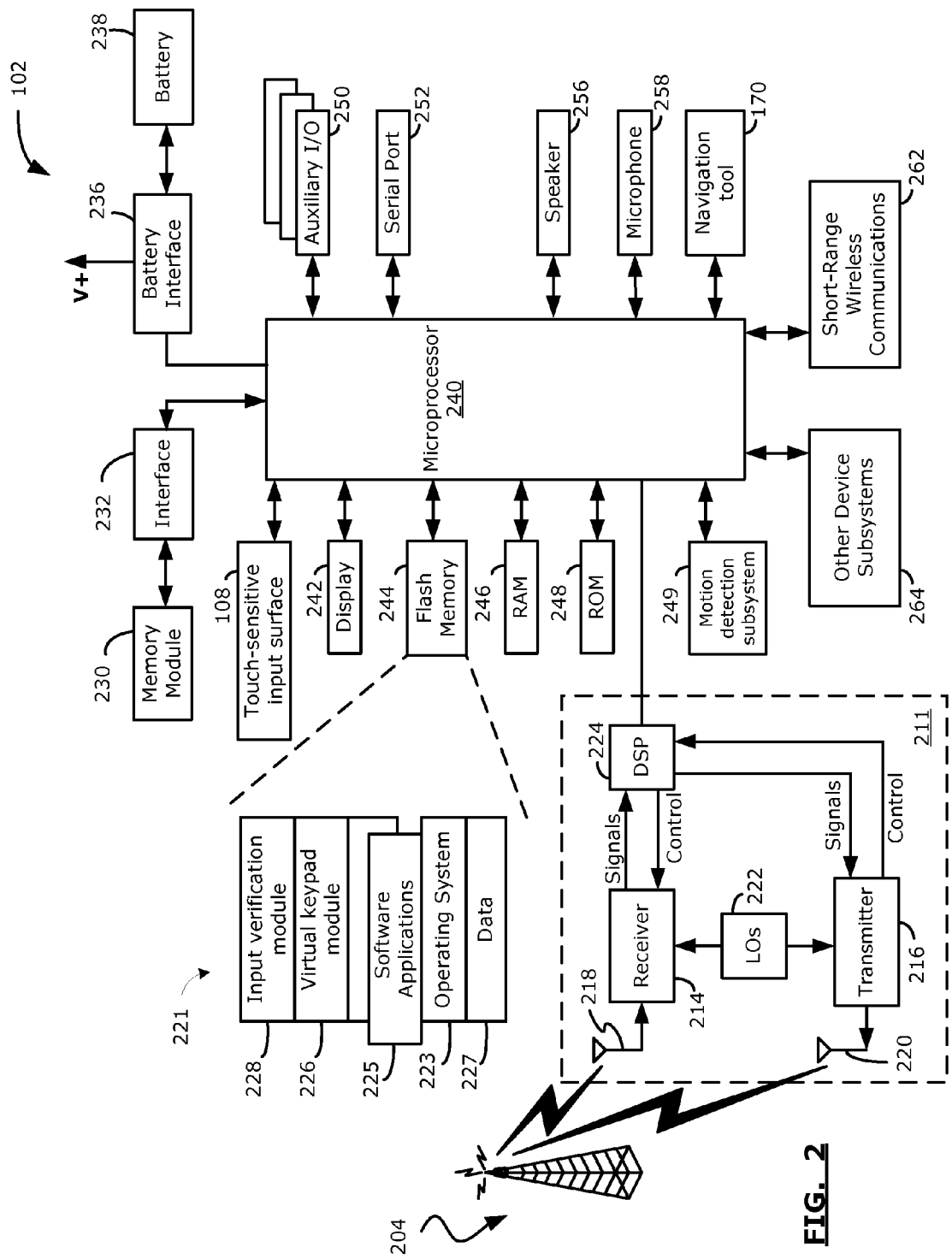
FIG. 2 is a block diagram illustrating a handheld electronic device in which example embodiments of the present disclosure can be applied.

Reference is first made to FIGS. 1A, 1B and 2 which illustrate a handheld electronic device 102 in which example embodiments described in the present disclosure can be applied. The handheld electronic device 102 is a two-way communication device having at least data and possibly also voice communication capabilities, and the capability to communicate with other computer systems, for example, via the Internet. The handheld electronic device 102 is sometimes referred to as a mobile communication device. Depending on the functionality provided by the handheld electronic device 102, in various embodiments the device may be a data communication device, a multiple-mode communication device configured for both data and voice communication, a smart-phone, a mobile telephone or a PDA (personal digital assistant) enabled for wireless communication, or a computer system with a wireless modem.

The handheld electronic device 102 includes a rigid case 104 for housing the components of the handheld electronic device 102 that is configured to be held in a user's hand while the handheld electronic device 102 is in use. The case 104 has opposed top and bottom ends designated by references 122, 124 respectively, and left and right sides designated by references 126, 128 respectively which extend transverse to the top and bottom ends 122, 124. In the shown embodiments of FIGS. 1A and 1B, the case 104 (and device 102) is elongate having a length defined between the top and bottom ends 122, 124 longer than a width defined between the left and right sides 126, 128. Other device dimensions are also possible.

The handheld electronic device 102 comprises a touchscreen display 106 mounted within a front face 105 of the case 104, and a motion detection subsystem 249 having a sensing element for detecting motion and/or orientation of the handheld electronic device 102. The motion detection subsystem 249 is used when the device 102 is in a keyboard mode, input verification mode, calibration mode or other modes utilizing input from a motion sensor. Although the case 104 is shown as a single unit it could, among other possible configurations, include two or more case members hinged together (such as a flip-phone configuration or a clam shell-style lap top computer, for example), or could be a "slider phone" in which the keyboard is located in a first body which is slide-ably connected to a second body which houses the display screen, the device being configured so that the first body which houses the keyboard can be slide out from the second body for use.

The touchscreen display 106 includes a touch-sensitive input surface 108 overlying a display device 242 (FIG. 2) such as a liquid crystal display (LCD) screen. The touchscreen display 106 could be configured to detect the location and possibly pressure of one or more objects at the same time. In some embodiments, the touchscreen display 106 comprises a capacitive touchscreen or resistive touchscreen. Capacitive and resistive touchscreens are well known in the art but will be briefly described for the purpose of background.

Capacitive touchscreens comprise an electrode layer sandwiched between a glass member and a transparent protective cover sheet on which the touch-sensitive input surface 108 is located. The electrode layer comprises a number of spaced apart transparent electrodes which each represent different coordinates in the input plane of the touchscreen 106. The electrodes are typically arranged in an array of spaced apart rows and columns which define the touch sensitive input surface 108 in Cartesian coordinates (e.g., x and y-axis coordinates). The intersection of the rows and columns represent pixels of the touchscreen display 106 which form the basis for the coordinate system in Cartesian coordinates. In contrast to a grid array, the electrodes may be arranged in an array of concentric and radial segments for polar coordinates. The intersection of concentric and radial segments, rather than rows and columns, represent the pixels of the touchscreen display 106 and form the basis of the coordinate system in polar coordinates.

The electrodes receive capacitive input from one or more objects touching the touch-sensitive input surface 108 in the proximity of the electrodes. When a conductive object contacts the touch-sensitive input surface 108, the object draws away some of the charge of the electrodes and reduces its capacitance. The controller of the touchscreen detects changes in capacitance which exceed a predetermined threshold, and determines the centroid of the contact area defined by electrodes having a change in capacitance which exceeds the predetermined threshold, for typically in x, y (Cartesian) coordinates. The change in capacitance which results from close presence of a conductive object such as a finger (referred to as finger presence) is usually too small to exceed the predetermined threshold, however it is possible and in such cases the corresponding electrode would be included in the contact area. The controller sends the centroid of the contact area to the controller of the handheld electronic device as the location of the external force (e.g. touch) detected by the touchscreen display.

Resistive touchscreens use a thin, flexible membrane comprised of transparent materials which covers a glass substrate. A transparent protective layer covers the outer surface of the membrane. The substrate surface and inner membrane surface which faces the substrate each have a transparent metallic coating on them which form a pair of electrode layers which are separated by spacers. The transparent metallic coating may be applied in a manner which forms a series of ridges and grooves which make up electrode elements in the two electrode layers. The electrode elements are typically arranged in an array of spaced apart rows and columns which define the touch sensitive input surface 108 in Cartesian coordinates (e.g., x and y-axis coordinates). The intersection of the rows and columns represent pixels of the touchscreen display 106 which form the basis for the coordinate system in Cartesian coordinates. In contrast to a grid array, the electrodes may be arranged in an array of concentric and radial segments for polar coordinates. The intersection of concentric and radial segments, rather than rows and columns, represent the pixels of the touchscreen display 106 and form the basis of the coordinate system in polar coordinates.

An electric current runs through each of the electrode layers during operation. When an object such as a user's finger touches the screen, the two electrode layers make contact causing a change in the resistance and a change in the electrical field at the area of contact. The controller detects changes in the electrical field which exceed a predetermined threshold, and determines the centroid of the contact area defined by electrodes having a change in the electrical field which exceeds the predetermined threshold, for typically in x, y (Cartesian) coordinates. The controller sends the centroid of the contact area as the location of the external force (i.e. touch) to the controller of the handheld electronic device as the location of the external force (e.g. touch) detected by the touchscreen display.

It will be appreciated that capacitive touchscreens and resistive touchscreens and other touchscreen technologies may be used to create a pixel image of the finger profile area or contact area created by an external force such as a touch applied to the touchscreen and/or by finger presence (i.e., for capacitive touchscreens). The pixel image is defined by the pixel elements represented by the intersection of electrodes in an electrode array which comprises the touchscreen. The pixel image may be used, for example, to determine a shape or profile of the contact area of the device user's finger, and other purposes.

The centroid of the contact area is calculated based on raw location and magnitude (e.g. capacitance or resistance) data obtained from the contact area. The centroid is defined in Cartesian coordinates by the value $(X_c, Y_c)$. The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i} \quad (1)$$

$$Y_c = \frac{\sum_{i=1}^{n} Z_i * y_i}{\sum_{i=1}^{n} Z_i} \quad (2)$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value or resistance) at each pixel in the contact area, the index i represents the electrodes in the contact area and n represents the number of electrodes in the contact area. Other methods of calculating the centroid will be understood to persons skilled in the art.

The touchscreen display 106 is typically connected via interrupt and serial interface ports of the processor 240. In this way, an interrupt signal which indicates a touch event has been detected and raw data regarding the location and magnitude (e.g. capacitance or resistance) of activation in the contact area may be passed to the processor 240. However, only of these types of connection to the processor 240 could be used in some embodiments. Accordingly, detection of a touch event (i.e., the application of an external force to the touch-sensitive input surface 208 of the touchscreen display 106) and/or determining the location of the touch event may be performed by either the controller of the touchscreen display 106 or the processor 240 of the device 102, depending on the embodiment.

In other embodiments, the touchscreen display 106 may be a display device such as an LCD screen having a touch-sensitive input surface 108 integrated therein. An example of such a touchscreen is described in commonly owned U.S. patent publication no. 2004/0155991, published Aug. 12, 2004 (also identified as U.S. patent application Ser. No. 10/717,877, filed Nov. 20, 2003) which is incorporated herein by reference.

The sensing element of the motion detection subsystem 249 is typically located behind the position of the virtual keyboard of the handheld electronic device 102. Where the position of the virtual keyboard is variable, the sensing element is typically located behind a position of the virtual keyboard of the handheld electronic device 102 which is considered to be the most common or normal position.

While specific embodiments of a touchscreen display have been described, any suitable type of touchscreen in the handheld electronic device of the present disclosure including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the handheld electronic device and its particular application and demands.

The handheld electronic device 102 includes a controller comprising at least one processor 240 such as a microprocessor which controls the overall operation of the handheld electronic device 102. A graphical user interface (GUI) for controlling and interacting within the device 102 via touchscreen display 106 and other input devices, receiving input from the touchscreen display 106, other input devices and motion detection subsystem 249, and providing output responsive to the input from the touchscreen display 106, other input devices and the motion detection subsystem 249.

The GUI of the device 102 has a screen orientation in which the text and user interface elements of the GUI are oriented for normal viewing. It will be appreciated that the screen orientation for normal viewing independent of the language supported, that is the screen orientation for normal viewing is the same regardless of whether a row-oriented language or column-oriented language (such as Asian languages) is displayed within the GUI.

In embodiments such as that shown in which the display screen is rectangular in shape, the screen orientation is either portrait (vertical) or landscape (horizontal). A portrait screen orientation is a screen orientation in which the text and other user interface elements extend in a direction transverse (typically perpendicular) to the length (y-axis) of the display screen. A landscape screen orientation is a screen orientation in which the text and other user interface elements extend in a direction transverse (typically perpendicular) to the width (x-axis) of the display screen. In some embodiments, the GUI of the device 102 changes its screen orientation between a portrait screen orientation and landscape screen orientation in accordance with changes in device orientation. In other embodiments, the GUI of the device 102 does not change its screen orientation based on changes in device orientation.

The processor 240 may also use the input of the motion detection system 249 to detect the orientation (position) of the handheld electronic device 102 and/or the motion of the device 102 to dynamically change the orientation of the GUI presented within the touchscreen display 106 in accordance with the current device position or orientation as required. In some embodiments, the processor 240 uses input from the motion detection system 249 to determine the current orientation (position) of the device 102 (or a change in orientation) and dynamically changes the screen orientation of the GUI presented within the touchscreen display 106 in accordance with predefined screen orientation to device orientation mappings. For example, in some embodiments, if the touchscreen display 106 is rectangular in shape the processor 240 may change the screen orientation of the GUI to a landscape (or horizontal) screen orientation when the device 102 is (re)positioned in a generally horizontal direction, and change the screen orientation of the GUI to a portrait (or vertical) screen orientation when the device 102 is (re)positioned in a generally vertical direction. In some embodiments, if the processor 240 may invert or "flip" the screen orientation of the GUI horizontally or vertically if the device 102 is flipped horizontally or vertically.

FIGS. 1A and 1B illustrate two embodiments of a virtual keyboard mode of the handheld electronic device 102 in which the touchscreen display 106 displays a GUI comprising a virtual keyboard 134 comprising a plurality of virtual keys or buttons, identified individually by reference numerals 136, 138, 140, 142, 144, 146 for user input of displayable characters (alphanumeric characters or symbols such as pound and asterisk) and/or commands by taping or pressing the region or portion of the touchscreen display 106 in which the virtual keys are displayed.

FIG. 1A illustrates a portrait screen orientation of the virtual keyboard 134 in which the virtual keyboard 134 is displayed between the left and right sides 126, 128 of the device 102 in the lower portion of the touch-sensitive input surface 208 towards the bottom 124 of the device 102. A virtual keyboard 134 in a portrait screen orientation scrolls horizontally across the face 105 of the device 102 in the same general direction as its width. In other embodiments, the virtual keyboard 134 may be located elsewhere (e.g. towards the top of touch-sensitive input surface 208) and may occupy a larger or smaller portion of the touchscreen display 106 than that shown in FIG. 1A. In some embodiments, the virtual keyboard 134 in the in the portrait screen orientation may occupy a majority of the touch-sensitive input surface 208 of touchscreen display 106.

Figure 14:
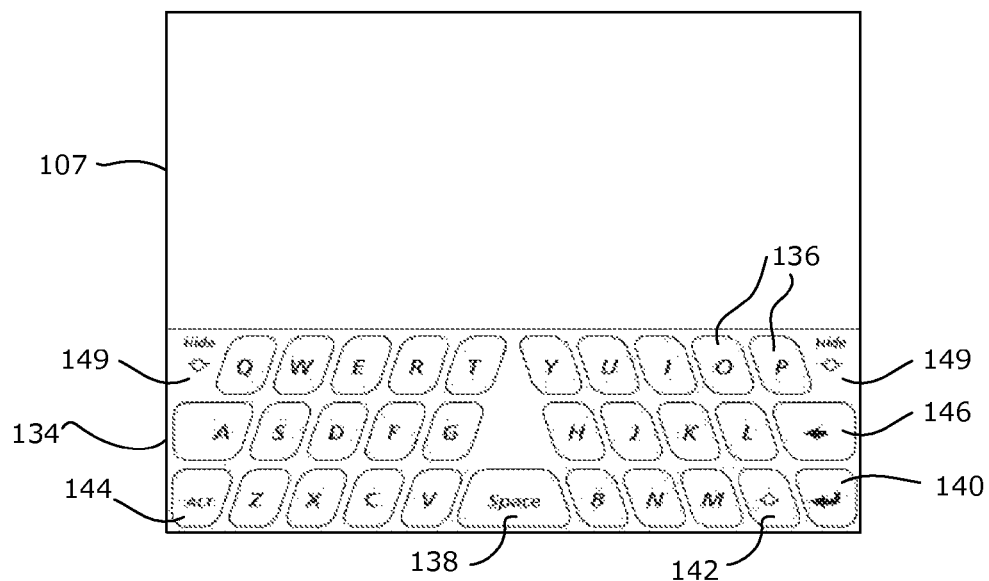
FIG. 14 is a screen representation of a virtual keyboard in accordance with another embodiment of the present disclosure.

FIG. 1B illustrates a landscape screen orientation of the virtual keyboard 134 in which the virtual keyboard 134 is displayed between the top and bottom 122, 124 of the device 102. A virtual keyboard 134 in the landscape screen orientation scrolls horizontally across the face 105 of the device 102 in the same general direction as its length. In other embodiments, the virtual keyboard 134 may be located elsewhere on the touchscreen display 106 and may occupy a larger or smaller portion of the touchscreen display 106 than that shown in FIG. 1B. In some embodiments, the virtual keyboard 134 in the landscape screen orientation may occupy a majority of the touchscreen display 106. FIG. 14 illustrates an alternative virtual keypad similar to that shown in FIG. 1B with the notable difference that the virtual keypad of FIG. 14 includes a pair of "Hide" virtual keys 149 for hiding the virtual keypad 134. In other input modes (not shown), virtual keys for displaying the virtual keypad 134 would be presented.

In both the portrait screen orientation and landscape screen orientation in the shown embodiments, the virtual keyboard 134 is located in a lower portion of the GUI relative to the screen orientation (and typically the current device orientation) so that it may be more easily touched (or actuated) using the thumbs or other fingers of the user while the user is holding the handheld electronic device 102. In some embodiments, the device components may be configured and dimensioned so that user may hold the handheld electronic device 102 in such a manner to enable two-thumb typing on the virtual keyboard 134 of the handheld electronic device 102 (typically using both hands). In other embodiments, the device components may be configured and dimensioned so that the handheld electronic device 102 can be cradled in the palm of a user's hand and the virtual keyboard 134 may be touch with the thumb of the hand of the user in which the handheld electronic device 102 is being held. A user may use a stylus instead of fingers (e.g., thumbs) if desired. It will be appreciated that, if a capacitive touchscreen is used, fingers or a conductive device (such as a stylus having a conductive tip) should be used to register a touch input.

In the example embodiments illustrated in FIGS. 1A and 1B, the virtual keyboard 134 comprises a plurality of substantially similarly sized alphanumeric keys or buttons 136 and a larger elongated space bar key or button 138. The alphanumeric keys 136 are arranged in a plurality of rows across the touchscreen display 106 with the elongate space bar key 138 located centrally below the last row of alphanumeric keys 136. In an example embodiment, at least one of the virtual keys 136 has one or more displayable character associated therewith. The virtual keyboard 134 also comprises non-alphanumeric command and/or control buttons or keys, such as a line feed or "ENTER" key 140, a "CAP" key 142 for capitalizing letters, an "ALT" key 144 for selecting an alternative input or command, and a "BACKSPACE" key 146 which backs up the cursor when the device is in a text input mode and removes the previous character input. Additional virtual control keys such as "SHIFT" and "CTRL" keys may be provided in other embodiments. Alternatively, one or more mechanical control keys may be provided to invoke the secondary or alternate input of the virtual keys 136. The mechanical control keys could be the "SHIFT" and/or "CTRL" keys, or possibly an "ALT" key replaying that in the virtual keyboard 134 of the illustrated embodiment. The control buttons or keys can be pressed (pressed once or continually pressed down, depending on the key and device configuration) to provide an alternative input of the keys 136 or other input component when pressed. As will be appreciated by those skilled in the art, keys that give alternative meaning to other input components enable expanded input capability.

The virtual keyboard 134 may also comprise one or more specialized keys (not shown) such as a menu key which invokes context-sensitive menus comprising a list of context-sensitive options, a back key which cancels action or reverses ("backs up") through previous user interface screens or menus displayed on the touchscreen display 106, a hang up key to end a voice call, and/or an answer key to answer an incoming voice call.

In the some embodiments, the virtual keyboard 134 may be supplemented with other input mechanisms such as a navigation tool 170 which may be a rotatable and depressible thumbwheel or scroll wheel, or a depressible (or "clickable") rolling member or trackball. In the shown embodiment, the navigation tool 170 is positioned in the bottom end of the handheld electronic device 102 for actuation by the thumbs of the device user while it is being held in one or two hands, depending on the embodiment. In the shown embodiment, the navigation tool 170 is located centrally between two pairs of mechanical control keys or buttons 172 which generate corresponding input signals when activated. The navigation tool 170 and control buttons 172 provide a control portion for the device 102. In other embodiments, the navigation tool 170 may be located elsewhere such as on a side of the device 102 for convenient thumb scrolling by the hand(s) in which the device 102 is held. In other embodiments, more or less control buttons 172 may be used, or no control buttons 172 may be provided.

Other types of software and/or mechanical navigation tools may be used instead of, or in addition to, a scroll wheel or trackball. For example, a virtual touchpad or "slider bars" may be presented in a portion of the GUI displayed on the touchscreen display 106 to provide a one or two dimensional navigation area similar to a conventional touchpad. The virtual keyboard 134 may also be supplemented with other input mechanisms such as voice activated input.

In the above described embodiments, the virtual keyboard 134 comprises a full keyboard comprising a plurality of keys 136 each having an alphabetic letter associated with the key on one letter per key basis. This one-to-one pairing between letters and keys will be understood to persons of ordinary skill in the art and will not be described in detail herein. In order to facilitate user input, the alphabetic letters are typically configured in a familiar QWERTY, QWERTZ, AZERTY, or Dvorak layout known in the art. In some embodiments, the secondary input of function of keys 136 in a full virtual keyboard 134 which is accessed by a hard tap is capitalization of the respective letter.

In the device screen of FIG. 1A, the GUI also provides within the touchscreen display 106 a status bar 150 and icon selection menu 152. The status bar 150 displays information such as the current date and time, icon-based notifications, device status and/or device state. The icon selection menu 152 displays a plurality of pictorial icon menu items (icons) 154. The icon menu selection 152 provides the device user with choices of applications or functions that may be run on the mobile communication device 102. The icon menu items 154 are each selectable to link to, or launch, an associated application or function, or open an associated folder. The icon menu items 154 may, for example, be used to select an email manager application, a calendar application, a note pad application, or other application. The user can select an application to be launched by highlighting or focusing the icon menu item 154 associated with the respective application through movement of an on-screen position indicator 156 commonly referred to as a caret or cursor. The on-screen position indicator 156 may be moved through the icon menu items 154 using a navigation tool such as the navigation tool 170 (for example, by rotating a scroll wheel or trackball). When an icon menu item 154 is highlighted or focussed by the on-screen indicator 156, clicking on or depressing the navigation tool 170 results in selection of the focussed item 154. If the icon menu item 154 represents an application, selecting the menu icon item 154 causes the processor 240 to launch the application logically associated with the icon 154, for example, the email manager application. As will be appreciated by persons skilled in the art, the input action of "clicking" or depressing the navigation tool 170 is translated by the GUI into a request to launch or invoke the application or function, or open the folder associated with the selected icon 154.

In the device screen of FIG. 1B, a text entry mode user interface frame or window 107 is displayed above the virtual keyboard 134. The text entry mode user interface window 107 comprises a number of navigable and editable input fields and is used in a text input or entry mode. Several device applications 225 typically have an associated text entry mode such as, for example, email messaging applications, instant messaging applications, task list applications, calendar applications and notepad applications. In the shown embodiment, the window 107 is a message composition window associated with an email messaging application. The message composition window 107 comprises a header portion 174 including an address field (e.g., "To" field) and a subject field, and a body portion 176. The text entry mode user interface of the window 107 includes a cursor or on-screen position indicator 156 which provides visual feedback as to the current input location (e.g., current field and possibly current location in the respective field depending on the current field).

In the above described embodiments, the virtual keyboard 134 comprises a full keyboard comprising a plurality of keys 136 each having an alphabetic letter associated with the key on one letter per key basis. This one-to-one pairing between letters and keys will be understood to persons of ordinary skill in the art and will not be described in detail herein. In order to facilitate user input, the alphabetic letters are typically configured in a familiar QWERTY, QWERTZ, AZERTY, or Dvorak layout known in the art. In some embodiments, the secondary input of function of keys 136 in a full virtual keyboard 134 which is accessed by a hard tap is capitalization of the respective letter.

Figure 13:
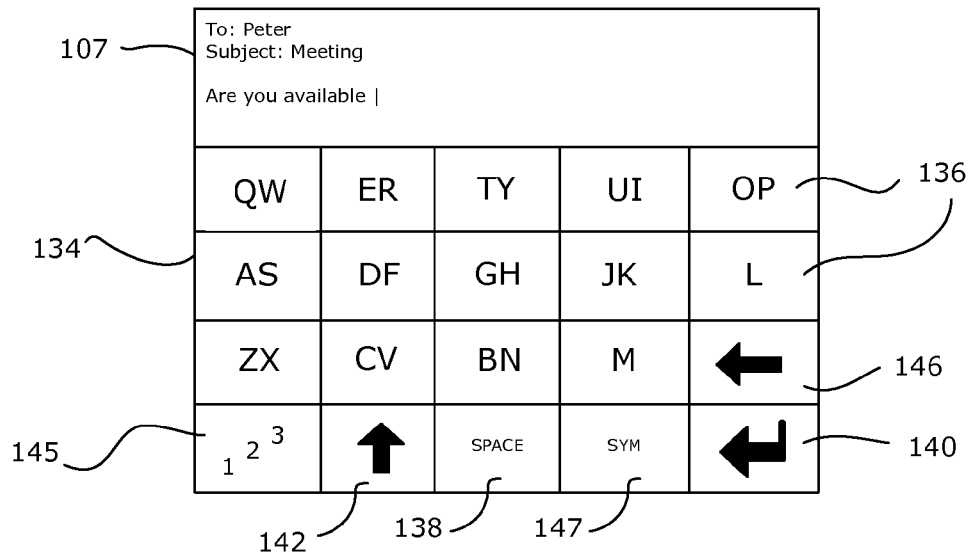
FIG. 13 is a screen representation of a virtual keyboard in accordance with another embodiment of the present disclosure.

Referring now to FIG. 13, a screen capture having an alternate embodiment of a virtual keyboard 134 is shown. The virtual keyboard of FIG. 13 is positioned below the input pane 107 and comprises a plurality of virtual keys 136 each having alphabetic letters associated with them. At least a portion of the virtual keys 136 have multiple letters associated with them. This type of configuration is sometimes referred to as a reduced keyboard. In the shown embodiment, the virtual keyboard 134 has three rows of keys 136. The top row of keys 136 has the alphabetic letter pairs "qw", "er", "ty", "ui" and "op". The middle row of keys 136 has the alphabetic letter pairs "as", "df", "gh" and "jk". The bottom row of keys 136 has the alphabetic letter pairs "zx", "cv" and "bn". The alphabetic letters "l" and "m" each have their own keys, and are located in the middle and bottom rows respectively. In at least some embodiments, the second letter of keys 136 having a two letter pair is selected by using a hard tap. For example, the letter "f" in the "df" key pair could be input by using a hard tap when striking the "df" key.

The virtual keyboard 134 also includes a numeric keypad 145 for invoking a numeric keyboard for inputting numbers, a symbol key 147 for invoking a symbol list for input symbols from a predetermined list of symbols, a spacebar key 138, an ENTER key 140, a CAP key 142, and a BACKSPACE key 146. In other embodiments, the virtual keyboard 134 could include one or more of an ALT key 144, SHIFT key, and CTRL key. The numeric keypad 145 may comprise the numbers 0 to 9 arranged in a rows similar to a numeric keypad 145 on a mechanical keyboard with, for example with the numbers 7, 8 and 9 in the top row, the numbers 4, 5 and 6 in the second row from the top, the numbers 1, 2 and 3 in the third row from the top, and the number 0 in the bottom row (e.g., as an enlarged virtual key which occurs all or most of the bottom row). The numeric keypad 145 may be similar to a calculator pad with at least some calculator functions such as add, subtract, multiply, divide, and enter or result. In some embodiments, the numeric keypad 145 may be presented adjacent to (beside) the virtual keyboard 134 (for example, for example to the left of the virtual keyboard 134).

While example keyboard layouts and configurations have been described, it will be appreciated by persons skilled in the art that alternative full or reduced keyboard layouts and configurations may be used in other embodiments of handheld electronic device 102.

Because typing strength varies across users, the predetermined strike force thresholds may be configurable by the user, or may be calibrated using a teaching mode of handheld electronic device 102 in which the user actively calibrates the strike force threshold for a normal tap and/or hard tap in accordance with the user's typing style and patterns, or a passive machine learning mode which monitors the device user's typing over a predetermined period of time to determine an average value of the user's strike force during a "normal" tap or "hard" tap. This functionality is provided by a calibration module (not shown) stored in the memory 230 of the handheld electronic device 102. In some calibration mode implemented by the calibration module, a baseline or average response for normal typing (normal taps) may be determined over a period of time. The predetermined strike force threshold may be set at a value slightly above the baseline response for normal tap, for example, based on a statistical measure of the baseline. Passive learning may be used to adjust the value of the predetermined strike force threshold as the user's typing style and patterns change over time. The purpose of calibration (whether active or passive) is to obtain an average of the device user typical strike force (or the average device user's typical strike force) when typing normally (i.e., a normal tap or touch) and/or when typing hard. Tapping the touchscreen display 106 with a strike force greater than or equal to the predetermined strike force threshold can then be interpreted as a request to select the alternate input or function of a virtual key.

While the terms touch, tap, press or contact may be used throughout the present disclosure, these terms are used for purposes of illustration only. The present disclosure is intended to apply to any application of external force to the handheld electronic device 102, whether by the user's fingers, a stylus, or otherwise. In addition, the terms "virtual key" and "virtual button" are used for purposes of illustration only. The present disclosure is intended to apply to any interactive user interface element depicted on the touchscreen display 106 of the handheld electronic device 102 such as an icon, button, key or other interactive user interface element having at least one touch-based input associated with it.

Motion Detection Subsystem

Referring to FIG. 2, example embodiments of the motion detection subsystem 249 will now be described. The motion detection subsystem 249 comprises a motion sensor connected to the processor 240 which is controlled by one or a combination of a monitoring circuit and operating software. The motion sensor is typically an accelerometer. However, a force sensor such as a strain gauge, pressure gauge, or piezoelectric sensor to detect the strike force may be used in other embodiments.

As will be appreciated by persons skilled in the art, an accelerometer is a sensor which converts acceleration from motion (e.g. movement of the handheld electronic device 102 or a portion thereof due to the strike force) and gravity detected by a sensing element into an electrical signal (producing a corresponding change in output) and is available in one, two or three axis configurations. Accelerometers may produce digital or analog output signals. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface.

The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland. Example low-g MEMS accelerometers are model LIS331DL, LIS3021DL and LIS3344AL accelerometers from STMicroelectronics N.V. The LIS3344AL model is an analog accelerometer with an output data rate of up to 2 kHz which has been shown to have good response characteristics in analog sensor based motion detection subsystems.

The accelerometer is typically located in an area of the handheld electronic device 102 where the virtual keyboard is most likely to be displayed in at least some the keyboard modes. For example, the keyboard in a lower or central portion of the handheld electronic device 102. This allows improved sensitivities of the accelerometer when determining or verifying inputs on a virtual keyboard by positioning the accelerometer proximate to the location where the external force will likely be applied by the user. Each measurement axis of the accelerometer (e.g., 1, 2 or 3 axes) is typically aligned with an axis of the handheld electronic device 102. For example, for a 3-axis accelerometer the x-axis and y-axis may be aligned with a horizontal plane of the handheld electronic device 102 while the z-axis may be aligned with a vertical plane of the device 102. In such embodiments, when the device 102 is positioned horizontal (such as when resting on flat surface with the display screen 242 facing up) the x and y axes should measure approximately 0 g and the z-axis should measure approximately 1 g.

To improve the sensitivity of the accelerometer, its outputs can be calibrated to compensate for individual axis offsets and sensitivity variations. Calibrations can be performed at the system level to provide end-to-end calibration. Calibrations can also be performed by collecting a large set of measurements with the handheld electronic device 102 in different orientations.

The handheld electronic device 102 may provide a user interface allowing a user of the device 102 to define or set operational aspects of the touchscreen display 106 and motion detection subsystem 249. As per typical GUIs, using the touchscreen display 106 and/or navigation tool 170 or other input device the user can navigate through a settings GUI which provides one or more setting options. Setting options in the GUI can be selected using the touchscreen display 106 and/or navigation tool 170.

In at least some keyboard modes, the processor 240 of the handheld electronic device 102 is configured to monitor the signals from the motion detection subsystem 249 and, based on a configurable or programmable time between the interrupt signal from the motion detection subsystem 249 and an interrupt signal from the touchscreen display 106 generated in response to detection of an external force (e.g. tap) being applied to the touch-sensitive input surface 108, determine whether a hard tap was applied to the touchscreen display 106. If the external force is determined to be a hard tap, the processor 240 selects an input from two or more possible inputs associated with the location of the external force in accordance with the external force being a hard tap. As noted above, the location of the external force is provided by the controller of the touchscreen display 106 typically as the centroid of a contact area. Alternatively, if the processor 240 determines that the external force is not a hard tap, the processor 240 selects an input from two or more possible inputs associated with the location of the external force in accordance with the external force being a normal tap. It is contemplated that, if more than two inputs are associated with a virtual key on the keyboard, a predetermined strike force threshold or predetermined strike force range could be associated with each input (e.g., to display a character on the display 204 or to perform an executable action) associated with the virtual key so that the strike force applied by the user may be used to select the appropriate input.

In at least some input verification modes, the processor 240 of the handheld electronic device 102 is configured to monitor the signals from the motion detection subsystem 249 and, based on a configurable or programmable time between the interrupt signal from the motion detection subsystem 249 and an interrupt signal from the touchscreen display 106 generated in response to detection of an external force (e.g. tap) being applied to the touch-sensitive input surface 108, determine whether a tap (whether it being a normal tap or a hard tap) was applied to the touchscreen display 106. The processor 240 verifies an input associated with the location of the external force when it is determined that a tap has occurred. The processor 240 rejects an input associated with the location of the external force when it is determined that a tap has not occurred.

Figure 7:
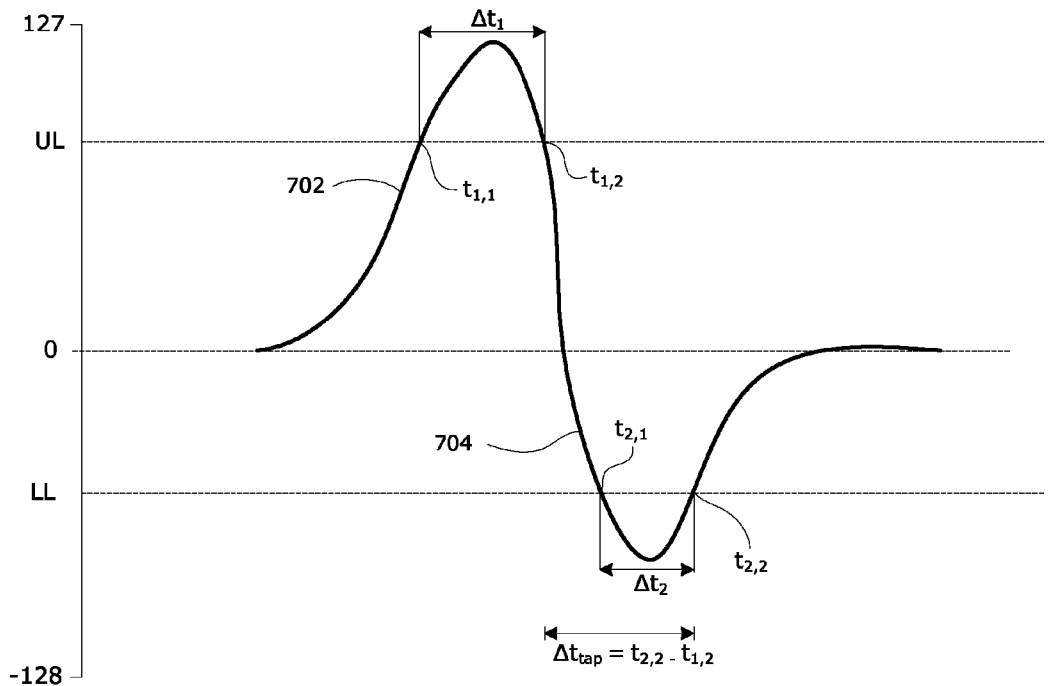
FIG. 7 is a graph illustrating an idealized tap response of an accelerometer having positive and negative response peaks.

Referring to FIG. 7, an idealized tap response of an accelerometer will now be described for the purpose of illustration. It will be appreciated that, rather than a smooth response curve, a real tap response will have fluctuations and variations which are not shown. FIG. 7 is a graph which illustrates a motion signal generated in respect of one sensing axis measured by the accelerometer. While output in FIG. 7 is shown in terms of an 8 bit digital output from a digital accelerometer or an A/D converter connected to an analog accelerometer, an output less than or greater than 8 bits could be obtained using 12-bit or 13-bit digital accelerometers commercially available as of the filing date of the present disclosure. While not shown, it will also be appreciated that the output can be calibrated to a "g" scale measured by the accelerometer. The motion signal is generated in response to a tap on a touch-sensitive input surface 108 of a touchscreen display 106. The accelerometer could be a single-axis accelerometer or a multi-axis accelerometer. The accelerometer comprises a sensing element such as, for example, a piezoelectric element, and a controller connected to the sensing element for controlling the operation of the accelerometer.

The tap response illustrates a first peak response 702 followed by a second response peak 704. The peaks 702, 704 are relative to a baseline in which no acceleration is detected. In FIG. 7, the accelerometer is calibrated to have a baseline measurement of zero (0), however, this may vary depending on the calibration of the accelerometer. In the illustrated the tap response, the motion signal illustrates a first, forward acceleration (sometimes referred to as acceleration) which appears as a positive peak (component) of the motion signal, and a second, backward acceleration (sometimes referred to as deceleration) which appears as a negative peak (component) of the motion signal. Depending on the orientation of the device 102 and the sensing axis or axes of the accelerometer or possibly the calibration of the accelerometer, a negative peak may occur first followed by a positive peak. Other tap responses of an accelerometer may have only one response peak. When a second response peak occurs, it is typically smaller in magnitude than the first response peak and of a different sign. Where the accelerometer is a multi-axis accelerometer, the sensing axes of the accelerometer may respond the same or differently. For example, one sensing axis may have a second reactionary peak whereas others sensing axes may not, depending on the orientation of the device 102 when the tap occurred and the characteristics of the tap event.

It has been observed that, in some use cases, the accuracy of tap detection may be increased by measuring both the positive and negative peaks of an accelerometer tap response rather than merely the first (typically positive) response peak. The accuracy can be further improved by analysing the duration of each of the positive and negative peaks, the duration of the peaks, and possibly the duration between the peaks. The use of these timing parameters may assist in mitigating the effects of motion which are not related to the application of an external force to the touchscreen display 106 but which nevertheless generate an accelerometer response. Examples of motions which may interfere with the accelerometer response during a tap event include motion due to falling or other rapid movements of the handheld electronic device 102 such as, for example, hand gestures made by the device user while holding the device 102.

In some embodiments, an upper limit (UL) threshold and lower limit (LL) threshold are defined and detected for the accelerometer response. The first response peak 702 is the portion of the accelerometer response which exceeds the upper limit threshold and second response peak 704 is the portion of the accelerometer response which is below the lower limit threshold as shown in FIG. 7. The lower limit threshold represents a predetermined strike force threshold for the first peak 702 and the lower limit threshold represents a predetermined strike force threshold for the second peak 704. The duration of time that the accelerometer output is above the upper limit and the duration of time that the accelerometer output is below the lower limit is measured by the motion detection subsystem 249. The duration of the time that the accelerometer output is above the upper limit is denoted $\Delta t_1$ and may be calculated as the difference between the start time (denoted $t_{1,1}$) and end time (denoted $t_{1,2}$) of a duration that the accelerometer output is above the upper limit. The duration of the time that the accelerometer output is below the lower limit is denoted $\Delta t_2$ and may be calculated as the difference between the start time (denoted $t_{2,1}$) and end time (denoted $t_{2,2}$) of a duration that the accelerometer output is below the lower limit.

In some embodiments, to implement tap detection interrupt signals are sent from the accelerometer of the motion detection subsystem 249 to the processor 240 when the upper limit threshold has been exceeded for a first predetermined duration and the lower limit threshold has been exceeded for a second predetermined duration. The processor 240 determines that a tap (hard tap or normal tap) has occurred when the interrupt signals corresponding to the upper and lower threshold are received within a predetermined duration of each other. The duration of a tap event (denoted $\Delta t_{tap}$) is typically calculated as the duration between the interrupt signals being received by the processor 240. By way of illustration using FIG. 7, assuming that interrupt signals are generated by the accelerometer at the end of the negative peak 704 ($t_{2,2}$) and at the end of the positive peak 702 ($t_{1,2}$), the duration of the tap event ($\Delta t_{tap}$) shown in FIG. 7 would be the value of the duration defined by $t_{2,2}-t_{1,2}$. However, $\Delta t_{tap}$ could alternatively be calculated as the difference between $t_{2,2}$ and $t_{1,1}$.

In other embodiments, tap detection may occur within the accelerometer itself using the hardware of the motion detection subsystem 249 rather than being determined by the processor 240 of the handheld electronic device 102. In yet other embodiments, tap detection may be determined by the processor 240 using raw data from the motion detection subsystem 249 rather than interrupt signals sent from the accelerometer. In these other embodiments, the tap event duration may be calculated as the duration between the start of the first speak 702 and the end of the second peak 704. Other definitions of tap duration could also be used in other embodiments.

The order in which the upper limit threshold and lower limit threshold are exceeded is typically not considered because the thresholds can be exceeded in either order, depending on the orientation of the handheld electronic device 102 during a tap event. However, the order may be considered in some embodiments. The absolute value of the upper limit and lower limit is typically the same. The upper limit threshold and lower limit threshold may be approximately 0.5 g in some embodiments. It is believed that this value may correspond to the average strike force for a tap among some users, thereby improving the accuracy of tap detection for at least some users. The value of the first and second predetermined durations are also typically the same. Using the same values for the upper limit threshold and the lower limit threshold, and the first and second predetermined durations, avoid introducing any bias associated with the orientation of the handheld electronic device 102 during a tap event. However, the upper limit threshold and lower limit threshold, as well as the first and second predetermined durations, could have different values.

To further improve sensitivity of the motion detection subsystem 249, both maximum and minimum values may be set for the first and second predetermined durations of the upper limit threshold and lower limit threshold. This ensures that the first predetermined duration in which the upper limit threshold has been exceeded is within a predetermined range, and that the second predetermined duration in which the lower limit threshold has been exceeded is within a predetermined range. This may increase the accuracy of tap detection even further, thereby reducing erroneous tap inputs.

In some embodiments, the duration between the first and second response peaks 702, 704 may be used to determine a rate of change of acceleration between the upper limit threshold and lower limit threshold. This involves calculating a zero-crossing slope (i.e., rise/fall per unit time) between the first response peak 702 and second response peak 704. The zero-crossing slope may be calculated using the rise or fall between the upper limit threshold and lower limit threshold (i.e., the difference between upper limit and lower limit) and the duration between the end of the first peak and the start of the second peak (i.e. $t_{2,1}-t_{1,2}$). Alternatively, the duration used in calculating the zero-crossing slope may be the duration between the time at which the upper limit threshold has been exceeded for the first predetermined duration and the time at which the lower limit threshold has been exceeded for the second predetermined duration. For example, duration used in calculating the zero-crossing slope may be the time between the sending of interrupt signals from the accelerometer of the motion detection subsystem 249 to the processor 240, or the time between when such interrupt signals are received by the processor 240. This may be the end of the first response peak 702 and second response peak 704 (i.e. $t_{2,2}-t_{1,2}$). Similarly, maximum and minimum values for the rate of change of acceleration (e.g., rise or fall) may also be set. These values may assist in differentiating the accelerometer response for a tap from that resulting from other events such as, for example, quick hand gestures while the handheld electronic device 102 is being held or other rapid movements of the handheld electronic device 102.

A tap event will have a higher rate of change of acceleration (e.g., a greater or "steeper" slope) than other events such as, for example, hand gestures or other rapid movements of the handheld electronic device 102. When the rate of change of acceleration exceeds a predetermined tap threshold, a tap input event has occurred and a tap input is registered, for example, by the operating system 223. When the rate of change of acceleration does not exceed the predetermined tap threshold, a tap input is not registered. It will be appreciated that a necessary precondition is that the measured acceleration exceeds both the upper limit threshold and lower limit threshold within a predetermined duration of each other.

Figure 16:
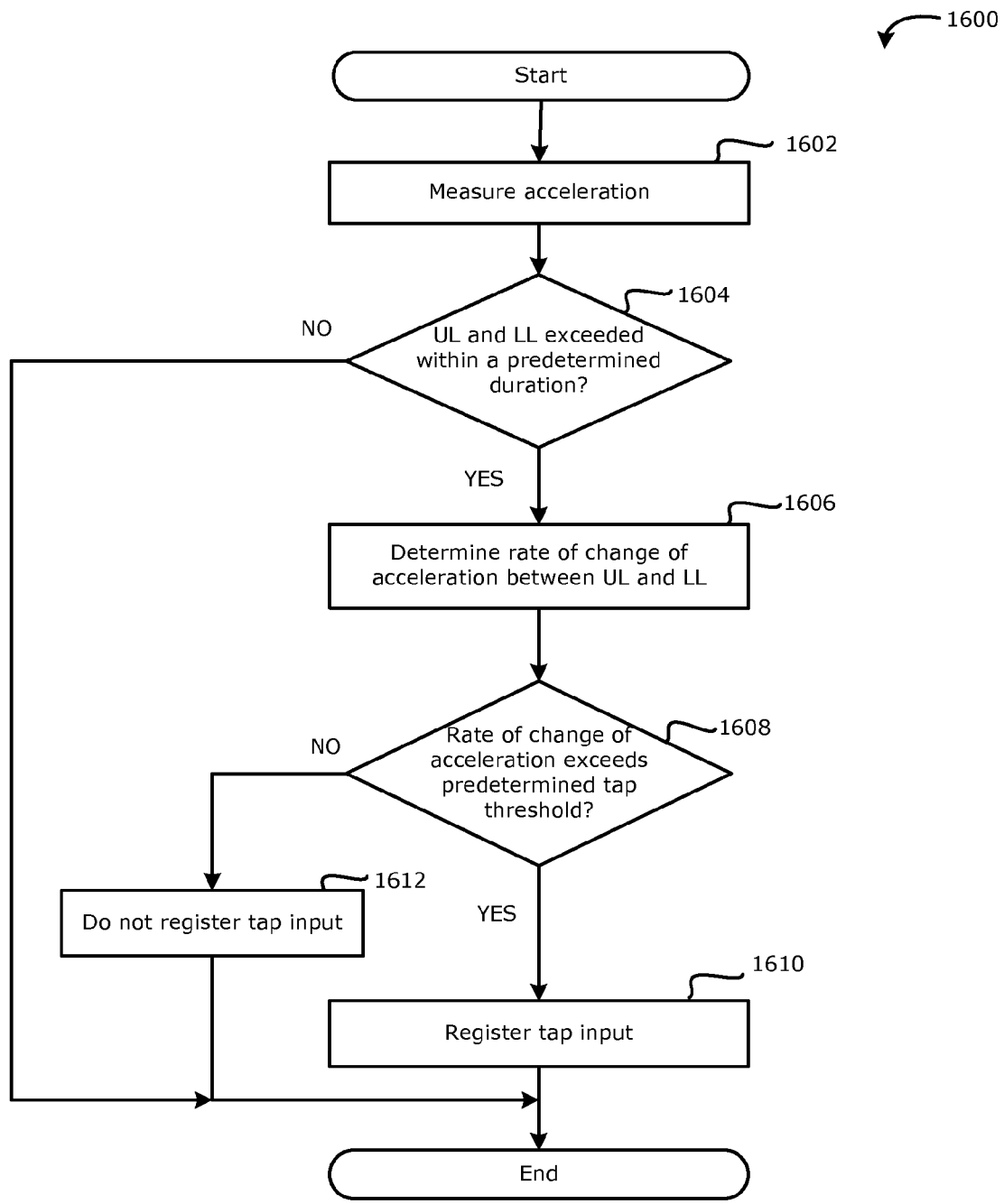
FIG. 16 is a flowchart illustrating example operations for tap detection on a handheld electronic device in accordance with one example embodiment of the present disclosure.

Referring briefly to FIG. 16, one embodiment of operations 1600 method for tap detection on a handheld electronic device in accordance with the present disclosure will be described. In the first step 1602, acceleration is measured using an accelerometer of the handheld electronic device 102.

Next, in step 1604 the measured acceleration is analysed in the manner described above. This analysis comprises determining when measured acceleration exceeds the upper limit threshold and the lower limit threshold within a predetermined duration of each other.

When the upper limit threshold and lower limit threshold have been exceeded, operations proceed to step 1606 where a rate of change of acceleration between the upper limit threshold and lower limit threshold is determined.

When the rate of change of acceleration exceeds a predetermined tap threshold (decision block 1608), operations proceed to step 1610 in which a tap input is registered, for example, by the operating system 223 (block 1610). When the rate of change of acceleration does not exceed the predetermined tap threshold, a tap input is not registered (block 1612). It will be appreciated that the result of the tap input will vary depending on the context in which the tap input was registered, namely it will depend on the result which maps to a tap event in the operational state of the device 102. The result of a tap input may vary in the same manner that the result of a keystroke, mouse click, or touch input may vary depending on the operational state of the device 102. This depends, at least in part, on the inputs recognized by the active application 222 or operating system 223 of the device 102 at the time of the tap input. The tap input may be used in combination with other input information such as, for example touch input, to generate a result. The tap input may correspond to, for example, predetermined character input, selection input, input to execute a predetermined command or function, or other suitable input.

Experimentation has shown that a tap event duration (sometimes referred to as a tap event window) of appropriately 20 milliseconds may be indicative of a tap. The duration before the first peak may be about 5 seconds, and the duration of the first peak ($\Delta t_1$) may be between 2 to 3 seconds. However, the tap event duration and other characteristics may depend on the particular device user as well as the accelerometer response time. Thus, a threshold for the tap event duration may be configurable or "tunable". In some embodiments, a maximum tap event duration may be used to eliminate accelerometer responses such as those resulting from movement of the device 102. The maximum tap event duration could be 20, 30 or 40 milliseconds.

It will be appreciated that the values for the various durations and thresholds mentioned above may vary between embodiments, and may be configurable in some embodiments to improve tap detection on an individual user basis.

The measured acceleration used in tap detection may be supplemented by information from the touchscreen display 106. In such embodiments, the touchscreen display 106 is used to detect touch inputs (i.e., on its touch-sensitive input surface 108). A tap input is registered only when the upper limit threshold and lower limit threshold are exceeded within a predetermined duration from when a touch input is detected by the touchscreen display 106. In some embodiments, the tap input is registered only when the upper limit threshold and lower limit threshold are exceeded within a predetermined duration from when a touch input corresponding to a selectable onscreen element is detected by the touchscreen display 106.

The method of tap detection may be embodied at least partially in software stored on the handheld electronic device 102 or may be embodied in a tap detection subsystem (or motion detection subsystem) in hardware and/or software which may be incorporated into a handheld electronic device 102. The method of tap detection may be used in the method of verifying input using a touchscreen display 106 of a handheld electronic device 102 described herein and a handheld electronic device 102 embodying such a method. Similarly, the method of tap detection may be used in the method of selecting input using a touchscreen display 106 of a handheld electronic device 102 described herein and a handheld electronic device 102 embodying such a method with some modification. For example, if two upper limit thresholds are provided with one upper limit threshold having a value higher than the other, and two lower limit threshold are provided with one lower limit threshold having a value higher than the other, the "lower" upper limit threshold and lower limit threshold may be applied in the manner described herein to detect a "normal" tap (i.e., to register a normal tap input) and the "higher" upper limit threshold and lower limit threshold may be applied in the manner described herein to detect a "hard" tap (i.e., to register a hard tap input).

Further, the method of tap detection may be used in a method of determining the tilt (or orientation) of a handheld electronic device 102, and a handheld electronic device 102 embodying such a method. Further still, the method of tap detection may be used in a method of removing the tilt from the reading of an accelerometer or other motion sensor of the handheld electronic device 102, and a handheld electronic device 102 embodying such a method.

Figure 3:
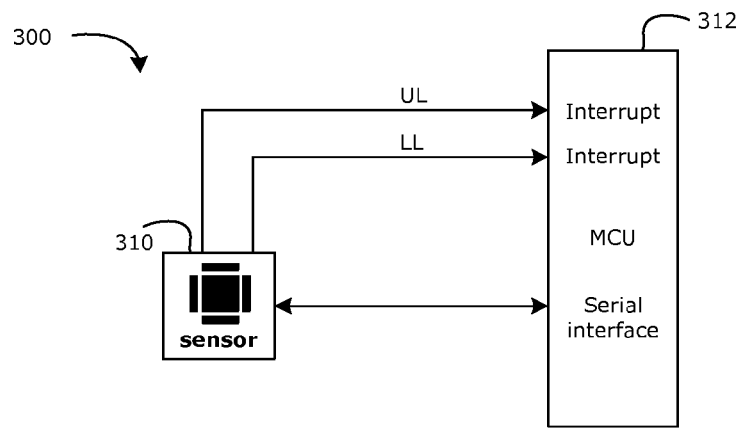
FIG. 3 is a block diagram of a motion detection subsystem comprising a digital motion sensor in accordance with one example embodiment of the present disclosure.

Referring now to FIG. 3, a circuit 300 for use in the motion detection subsystem 249 in accordance with one example embodiment of the present disclosure will be described. The circuit 300 comprises a digital accelerometer 310 connected to the interrupt and serial interface of a microprocessor (MCU) 312, which may be the processor 240 of the handheld electronic device 102. In some embodiments, the accelerometer may be a model LIS331DL accelerometer from STMicroelectronics N.V. In other embodiments, the accelerometer may be a model LIS302DL accelerometer from STMicroelectronics N.V. The model LIS331DL is smaller than the model LIS302DL, however both are 3-axis digital accelerometers.

The operation of the microprocessor 312 is controlled by software, which may be stored in internal memory of the microprocessor 312. The operational settings of the accelerometer 310 are controlled by the microprocessor 312 using control signals sent from the microprocessor 312 to the accelerometer 310 via the serial interface. One or more predetermined strike force thresholds are transmitted from the microprocessor 312 to the accelerometer 310. The predetermined strike force thresholds may be used in operations for selecting user input from two or more inputs in response to touch input on the touch-sensitive input surface 108 of the touchscreen display 106, or for verifying touch input on the touch-sensitive input surface 108. The predetermined strike force thresholds are programmable acceleration thresholds which may be set based on user and/or system calibration. A comparison of the measured acceleration of the accelerometer 310 to the predetermined strike force thresholds are performed using software internal to the accelerometer 310 which outputs interrupts to the microprocessor 312 when one or more of the predetermined strike force thresholds are exceeded. In other embodiments, rather than being performed by the accelerometer 310 the comparisons may be performed by the microprocessor 312 (typically the processor 240 of the handheld electronic device 102) based on raw data sent by the accelerometer 310 to the microprocessor 312 via the serial interface. Typically, this comparison and subsequent tap detection would be performed by the operating system 223 which returns a tap input, or possibly hard tap/soft tap input, to the active application and/or user interface framework which interprets this input accordingly. This data may be read in real-time by the microprocessor 312 at the sampling rate of the accelerometer 310, or less frequency at predetermined intervals. In such embodiments, the interrupts may not be required and could be omitted.

In some embodiments, the predetermined strike force thresholds are an upper limit threshold and lower limit threshold. The upper limit threshold and lower limit threshold may be the same magnitude or different magnitudes. The accelerometer 310 is connected to two interrupt pins on the interrupt interface of the microprocessor 312: one interrupt for the upper limit threshold and one interrupt for the lower limit threshold. A duration setting or parameter may also be associated with each threshold. The duration represents the length of time that the upper limit threshold or lower limit threshold must be exceeded before firing an interrupt to the microprocessor 312. In some embodiments, a time duration is set for each of the upper limit threshold and lower limit threshold. The durations are typically the same but may be different. When the upper and lower limits thresholds are exceeded for the respective durations, interrupt signals are sent by the accelerometer 310 to the microprocessor 312. The microprocessor 312 then determines (e.g. calculates) the amount of time lapsed between receiving the two interrupts and compares this value to a predetermined tap duration. If the amount of time lapsed between the two interrupt signals is greater than or equal to the predetermined tap duration, the motion detected by the accelerometer 310 is determined to be a tap. However, if the amount of time between the two interrupt signals is less than the predetermined tap duration, the motion detected by the accelerometer 310 is not determined to be a tap.

The value measured by the accelerometer 310 (e.g., the measured strike force) is also transmitted to the microprocessor 312, for example, for internal comparison or other processing (e.g., further processing) by the microprocessor 312 such as for calibration procedures. Although the measurement is sent to the microprocessor 312 continuously while the accelerometer 310 is active, the microprocessor 312 only reads the measurement signal when an interrupt signal is received.

If the accelerometer 310 is a multi-axis accelerometer such as a 3-axis accelerometer, the microprocessor 312 may be configured to generate and output interrupt signals to the microprocessor 312 when the predetermined strike force threshold is exceeded (for example, for a predetermined duration) along any one of its three axes. In other embodiments, the accelerometer 310 may use a weighted average of all axes.

The main axis of a multi-axis accelerometer 310 is that of the typing input plane of the touchscreen display 106 (sometimes referred to as the typing plane). For a 3-axis accelerometer, the z-axis is typically aligned with the typing plane. As shown in the tapping plot of in FIG. 6, when a tap occurs all three axes of a 3-axis accelerometer measure a response (e.g. an increase in the motion signal amplitude occurs due to detected motion). Thus, rather than checking an individual axis such as the main axis or z-axis, the other axes may also be checked to ensure a response occurs in those axes as well. For example, a check may be performed to ensure the motion signal amplitude increases in the x and y axes as well. In some embodiments, the accelerometer 310 may use a weighted average of all axes.

In some embodiments, a predetermined strike force threshold for a normal tap may be transmitted from the microprocessor 312 to the accelerometer 310 instead of, or in addition to, a predetermined strike force threshold for a hard tap. The upper limit threshold and lower limit threshold may be used in the same manner as described above; however the values of the thresholds are to values which correspond to a normal tap rather than a hard tap. The normal tap predetermined strike force threshold may be used for verifying inputs of the touchscreen display 106. Thus, multiple gain settings associated with operational modes of the device 102 may be stored in memory of the handheld electronic device 102 and transmitted to the accelerometer 310 when in the respective operational mode. For example, in a keyboard mode or other input mode or edit mode where hard taps are to be detected and used to select between two or more inputs, a higher gain setting (e.g. ±8 "g" for the accelerometer) is automatically selected for use by the accelerometer. In contrast, in an input verification mode or other mode where any tap is to be detected, a lower gain (e.g. ±2 "g" for the accelerometer) is automatically selected for use by the accelerometer.

Figure 4:
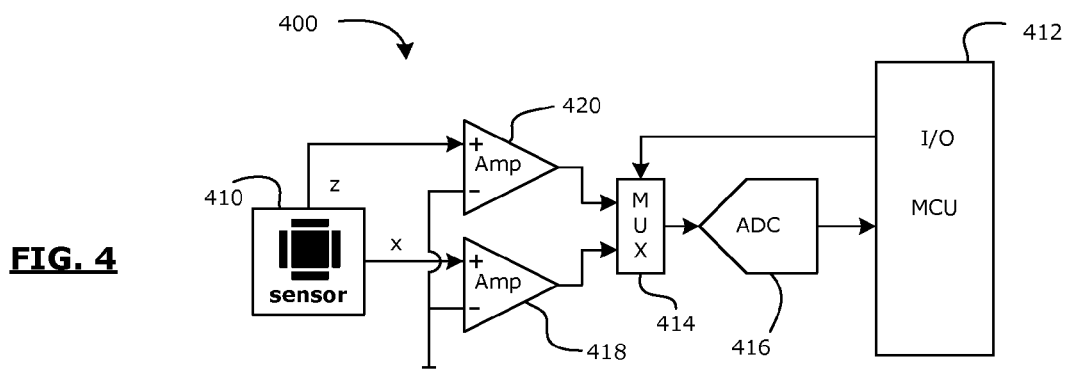
FIG. 4 is a block diagram of a motion detection subsystem comprising a two-axis analog motion sensor in accordance with another example embodiment of the present disclosure.

Referring to FIG. 4, a circuit 400 for use in the motion detection subsystem 249 in accordance with another example embodiment of the present disclosure will be described. The circuit 400 comprises an accelerometer 410 connected to a microprocessor (MCU) 412, which may be the processor 240 of the handheld electronic device 102. The accelerometer 410 is a 2-axis analog accelerometer 410 such as a 2-axis (e.g., x-axis and z-axis) analog accelerometer. The accelerometer 410 is connected to two operational amplifiers (denoted as "Amps" in FIG. 4) 418 and 420 which receive as inputs the respective output signals of the two measured axes (i.e., x-axis and z-axis) of the accelerometer 410. The amplifiers 418 and 420 buffer and amplify (increase) the signal strength of the inputs, and output the amplified signals to an analog multiplexer (denoted as MUX in FIG. 4) 414. The MUX 414 combines the two input signals from the amplifiers 418, 420 and outputs those signals in a single output channel similar to a controlled switch. The circuit 400 can be modified for a three-axis accelerometer 410 by adding an additional amplifier (now shown) for a third axis (e.g. y-axis) and connecting the output of the additional amplifier to the MUX 414.

The MUX 414 selectively provides its output according to a control signal generated by the microprocessor 412. The control signal equates to a request from the microprocessor 412 for data from either the x-axis or z-axis. In response, the MUX 414 outputs the measured value for x-axis or z-axis. The analog output of the MUX 414 is converted to a set of digital signals by an analog-to-digital converter (ADC) 416 which outputs the digital measurement stream to the microprocessor 412. Depending on the operational mode and the configuration of the handheld electronic device 102, the microprocessor 412 determines if a tap has occurred and/or possibly whether a normal tap or hard tap has been detected by the accelerometer 410 using control software. The control software performs a comparison of the measured acceleration of the accelerometer 410 to one or more predetermined strike force thresholds as described above in connection with FIG. 3.

The comparison may also involve a time parameter associated with the time between when the upper limit predetermined strike force threshold and lower limit predetermined strike force threshold are exceeded. The comparison may further involve time parameters associated with each predetermined strike force threshold (e.g. upper and lower limits) and determining if the predetermined strike force thresholds are exceeded for a predetermined duration.

Alternatively, in other embodiments a weighted average of the axes may be used rather than analyzing each axis individually. In such embodiments, a summing amplifier circuit could be used so that the microprocessor 412 analyzes a weighted average of the axes. The use of a weighted average at least partially mitigates against the effects of the device orientation or tilt on the readings of the accelerometer 410. The outputs of the Amps 418, 420 for each measurement axis would be input into a summing amplifier (not shown). The output of the summing amplifier would then be input into a comparator which would have a predetermined strike force threshold based on a weighted average of the measurement axes similar to the individual axis implementation described above.

Figure 5:
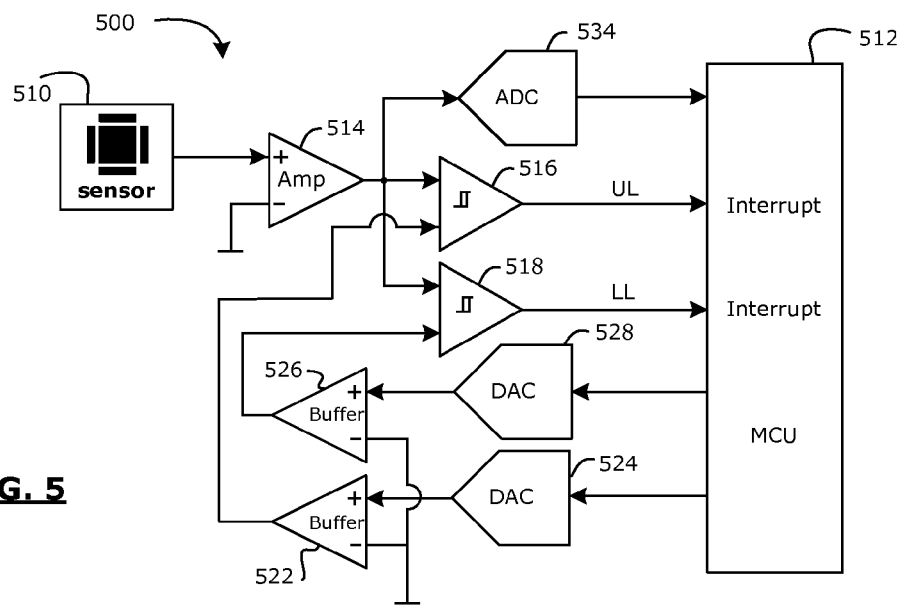
FIG. 5 is a block diagram of a motion detection subsystem comprising an analog motion sensor in which a single-axis is analyzed in accordance with another example embodiment of the present disclosure.

Referring to FIG. 5, a circuit 500 for use in the motion detection subsystem 249 in accordance with another example embodiment of the present disclosure will be described. The circuit 500 comprises an analog accelerometer 510 connected to a microprocessor (MCU) 512, which may be the processor 240 of the handheld electronic device 102. The circuit 500 applies adjustable upper limit upper limit and lower limit thresholds in tap detection for one axis of the accelerometer 510.

The accelerometer 510 may be oriented such that its output detects movement along a desired axis (e.g. the z-axis detecting when handheld electronic device 102 or portion thereof moved vertically or detecting typing or tapping on the touchscreen display 106). Additional axes may be controlled by replicating the circuit 500 for each additional axis. The output of the accelerometer 510 is provided to an operational amplifier (Amp) 514 which buffers and increases the signal strength of the input, and outputs the amplified signal in parallel to comparators 516 and 518. The comparators 516 and 518 compare the input signal received from the Amp 514 to an upper limit threshold and lower limit threshold. For the purpose of explanation, the comparator 516 is the upper limit comparator which compares the output of the amp 514 to an upper limit, and the comparator 518 is the lower limit comparator which compares the output of the amp 514 to a lower limit. The upper limit comparator 516 receives the upper limit signal as input from a buffer amp 522, which in turn receives the upper limit signal from a digital-to-analog converter (DAC) 524. The buffer amp 522 provides a steady, amplified analog signal representation of the upper limit signal which is received from the DAC 524. The DAC 524 generates an analog signal representation of the upper limit signal from a digital signal representation received from the microprocessor 512.

The lower limit comparator 518 receives the lower limit signal as input from a buffer amp 526, which in turn receives the lower limit signal from a DAC 528. The buffer amp 526 provides a steady, amplified analog signal representation of the lower limit signal which is received from the DAC 524. The DAC 524 generates an analog signal representation of the lower limit signal from a digital signal representation received from the microprocessor 512.

Alternatively, rather than using a pair of DACs 524, 528 and a pair of buffer amps 522, 526, in other embodiments the upper and lower level inputs of the comparators 516 and 518 may be taken from different taps of a resistor ladder connected to the comparators 516 and 518. However, this configuration would not allow the upper limit and lower limit to be programmable or configurable by the microprocessor 512. Alternatively, the threshold settings of the comparators 516, 518 may be implemented by digital potentiometers. In other embodiments, filters (not shown) may used to reduce noise and invalid signals generated by the comparators 516, 518. The filters would be connected between the comparators 516, 518 and the microprocessor 512. In yet other embodiments, a single comparator can be used to perform comparisons to a single threshold (limit).

If the value of the input signal received from the buffer amp 514 is greater than or equal to the upper limit signal received from the buffer amp 522, the upper limit comparator 516 outputs an interrupt control signal to the microprocessor 512 on a dedicated pin. If the value of the input signal received from the buffer amp 514 is less than or equal to the lower limit signal received from the buffer amp 526, the lower limit comparator 518 outputs an interrupt signal to microprocessor 512 on a dedicated pin. The microprocessor 512 determines (e.g. calculates) the amount of time between receiving the two interrupts and compares this value to a predetermined tap duration. If the amount of time between the two interrupt signals is greater than or equal to a predetermined tap duration, the motion detected by the accelerometer 510 is determined to be a tap. If the amount of time between the two interrupt signals is less than the predetermined tap duration, the motion detected by the accelerometer 510 is not determined to be a tap.

In some embodiments, the microprocessor 512 also determines the duration of time that each interrupt signal is received from the upper limit comparator 516 and lower limit comparator. If either of the predetermined strike force threshold is not exceeded for a predetermined duration, the motion detected by the accelerometer 510 is not determined to be a tap. Only if both of the predetermined strike force threshold are exceeded for a predetermined duration, the microprocessor 512 then determines the amount of time between receiving the two interrupts and compares this value to the predetermined tap duration.

In other embodiments, the outputs from the upper limit comparator 516 and lower limit comparator 518 may be connected to an OR gate (not shown). The output of the OR gate is connected to the microprocessor 512 interrupt input. If the OR gate receives a control signal from output of either comparator 516, 518, it generates a trigger signal in the form of an interrupt signal to the microprocessor 512 on a dedicated pin.

In the example embodiment of FIG. 5, the value (e.g., strike force) measured by the accelerometer 510 is also transmitted to the microprocessor 512, for example, for internal comparison or other processing (e.g., further processing) by the microprocessor 512 such as for calibration procedures. The Amp 514 is also connected to an analog-to-digital converter (ADC) 534 which outputs the amplified, measurement signal to the microprocessor 512. Although the measurement is sent to the microprocessor 512 continuously while the accelerometer 510 is active, the microprocessor 512 only reads the measurement signal when an interrupt signal is received.

As the operation of the microprocessor 512 is controlled by software, the upper limit and lower limit of the upper limit comparator 516 and lower limit comparator 518 may be set in accordance with user settings or calibration of the respective control software. It will be appreciated that the upper and lower limits can be used to define a range of signals detected by the accelerometer 510 representing different types of taps or other external forces applied to the touch-sensitive input surface 108 of the touchscreen display 106. For example, in a keyboard mode or other input mode in which hard taps are used to select between two or more inputs, a relatively high threshold may be set for the upper and lower limits to detect when a hard tap has occurred. In an input verification mode, a lower threshold may be set for the upper and lower limits can to detect when either a normal or hard tap has occurred. It is also possible for the microprocessor 512 to monitor for and detect the upper and lower limits for a keyboard mode or other input mode and input verification mode at the same time. These thresholds (limits) may be stored in association with respective operational modes of the device 102 and used when the device 102 is in the respective operational mode.

While the circuit 500 shown in FIG. 5 is for one sensing axis, it will be appreciated by persons skilled in the art that a circuit 500 can be used for each sensing axis of a multi-axis accelerometer. Alternatively, as described above in connection with the circuit 400 a weighted average of the axes may be used rather than analyzing each axis individually. The use of a weighted average at least partially mitigates against the effects of the device orientation or tilt on the readings of the accelerometer 510. A summing amplifier circuit could be used so that the microprocessor 412 analyzes a weighted average of the axes.

In at least some embodiments, noise of the upper and lower limits may be conditioned out to reduce or eliminate multiple trips as a noisy signal crosses the upper and lower limits. In such embodiments, hysteresis may be used at each of the upper and lower limits to assist in filtering out noise. In some embodiments, hysteresis may be provided by using a Schmitt trigger at each of the upper and lower limits. As will be appreciated by persons skilled in the art, a Schmitt trigger is a comparator circuit that incorporates feedback: (1) when the input to the Schmitt trigger exceeds the first threshold for the limit, the output is high; (2) when the input falls below a second (lower) threshold of the limit, the output signal is low; and (3) when the input is between the first and second thresholds, the output retains its value. The trigger retains its output value until the input changes sufficiently to trigger a change (i.e., when the input signal changes from the first to second threshold). This dual threshold action is called hysteresis.

The benefit of a Schmitt trigger over a circuit with only a single input threshold is greater stability (noise immunity). With only one input threshold, a noisy input signal near that threshold could cause the output to switch rapidly back and forth from noise alone. A noisy input signal of Schmitt trigger near one threshold can cause only one switch in output value, after which it would have to move to the other threshold in order to cause another switch.

Alternatively, rather than using a Schmitt trigger other filters for reducing input signal noise may be used. For example, a bandpass filter could be tuned to remove any high frequency component as in the circuit of FIG. 5 described below. Alternatively, hysteresis may be performed using software in the processor 240 of the handheld electronic device 102 can be used to debounce the interrupt signals it receives.

It will be appreciated that in embodiments such as FIGS. 4 and 5 in which an analog accelerometer is used, all the comparisons occur in the microprocessor of the handheld electronic device 102 and so any number of thresholds could be set and used. For example, upper limit and lower limit thresholds could be set and checked for both normal taps and hard taps. These thresholds may be stored in association with respective operational modes of the handheld electronic device 102 and used when the device 102 is in the respective operational mode. It is also contemplated that predetermined strike force ranges could be set and checked for both normal taps and hard taps. Moreover, rather than merely differentiating between normal and hard taps, further granularity may be implemented for differentiating between the strike force applied to the touchscreen display and selecting between two or more inputs. For example, normal, medium-hard, and hard taps may be detected. However, as will be appreciated by persons skilled in the art, more calibration and tuning would be required to differentiate between more than two types of taps to reduce false positives while taking into account individual typing techniques (i.e. orientation of device when held, force of typing, whether the user is in motion (e.g. walking) as they are typing, etc.).

Figure 6:
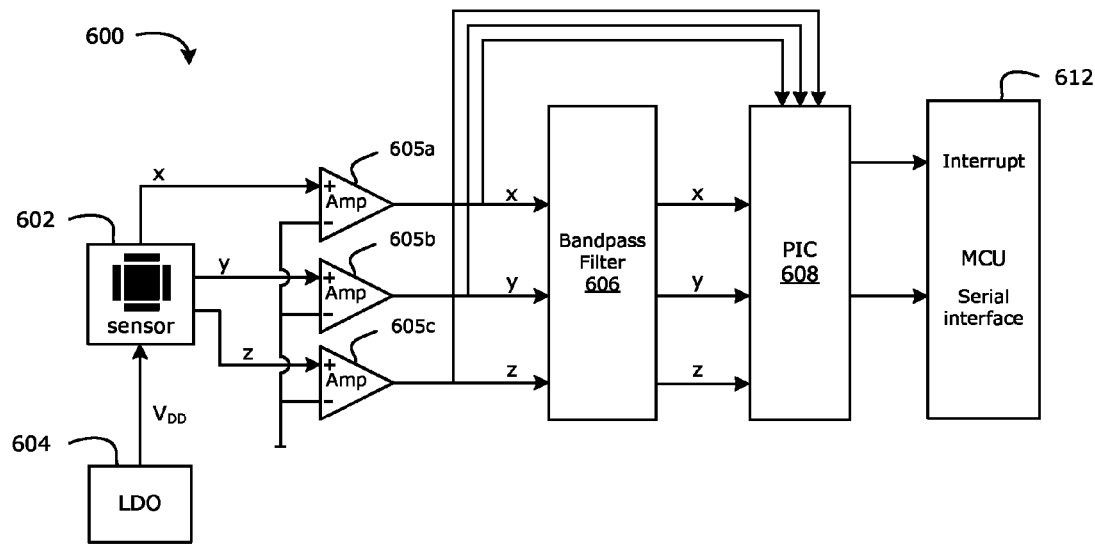
FIG. 6 is a block diagram of a motion detection subsystem comprising a three-axis digital motion sensor in accordance with another example embodiment of the present disclosure.

Referring to FIG. 6, a circuit 600 for use in the motion detection subsystem 249 in accordance with another example embodiment of the present disclosure will be described. The circuit 600 comprises a three-axis analog accelerometer 602 having the outputs of each of three-axes connected to Amp 605a, Amp 605b and Amp 605c (referred to as Amps 605 collectively). The accelerometer 602 is optionally connected to a Low Drop-Out (LDO) regulator 604 which supplies a constant voltage (voltage drain or $V_{DD}$) with low noise. Advantageously, the LDO regulator 604 can be used to reduce radiometric errors of the accelerometer 602. To reduce the power drawn by the accelerometer 602, power cycling (e.g. using pulse width modulation techniques) can be employed so that the accelerometer 602 is only intermittently active, for example, ⅙ of the time.

The output of the Amps 605 is connected to a bandpass filter 606. The bandpass filter 606 has three outputs corresponding to each of the measured axes of the accelerometer 602. The outputs of the bandpass filter 606 are connected to a Programmable Interface Controller (PIC) 608 with a built-in ADC. In other embodiments, the PIC 608 could be replaced with a 3-input MUX followed by an ADC. The PIC 608 may be implemented using any suitable microprocessor having a built-in ADC and sufficient sampling rate. The PIC 608 samples and holds the input, which the built-in ADC coverts from analog to digital form. The PIC 608 is connected to an interrupt pin on a microprocessor (MCU) 612, which may be the processor 240 of the handheld electronic device 62. A serial interface also connects the PIC 608 and microprocessor 612. While not shown, the accelerometer 602 may be connected to the PIC 608 via a power pin so that the PIC 608 is powered on when the accelerometer 602 is powered on, taking further advantage of power cycling. In other embodiments, rather than a PIC a low power Field-Programmable Gate Array (FPGA) may be used. In other embodiments, a high pass filter may be used rather than the bandpass filter 606.

Referring now to FIG. 12A to 12C, the assignment of pitch and roll vectors of a three-axis digital accelerometer in accordance with an example embodiment of the present disclosure will be described. The accelerometer has three sensing axes denoted "x", "y" and "z". The x-axis and y-axis are aligned with a horizontal plane defined of the handheld electronic device 102 (typically an input plane of the touchscreen display 106). The z-axis is perpendicular to the horizontal plane of the handheld electronic device 102. The z-axis will detect when the handheld electronic device 102 is moved vertically as well as detecting typing or taping on the touchscreen display 106.

Figure 15A:
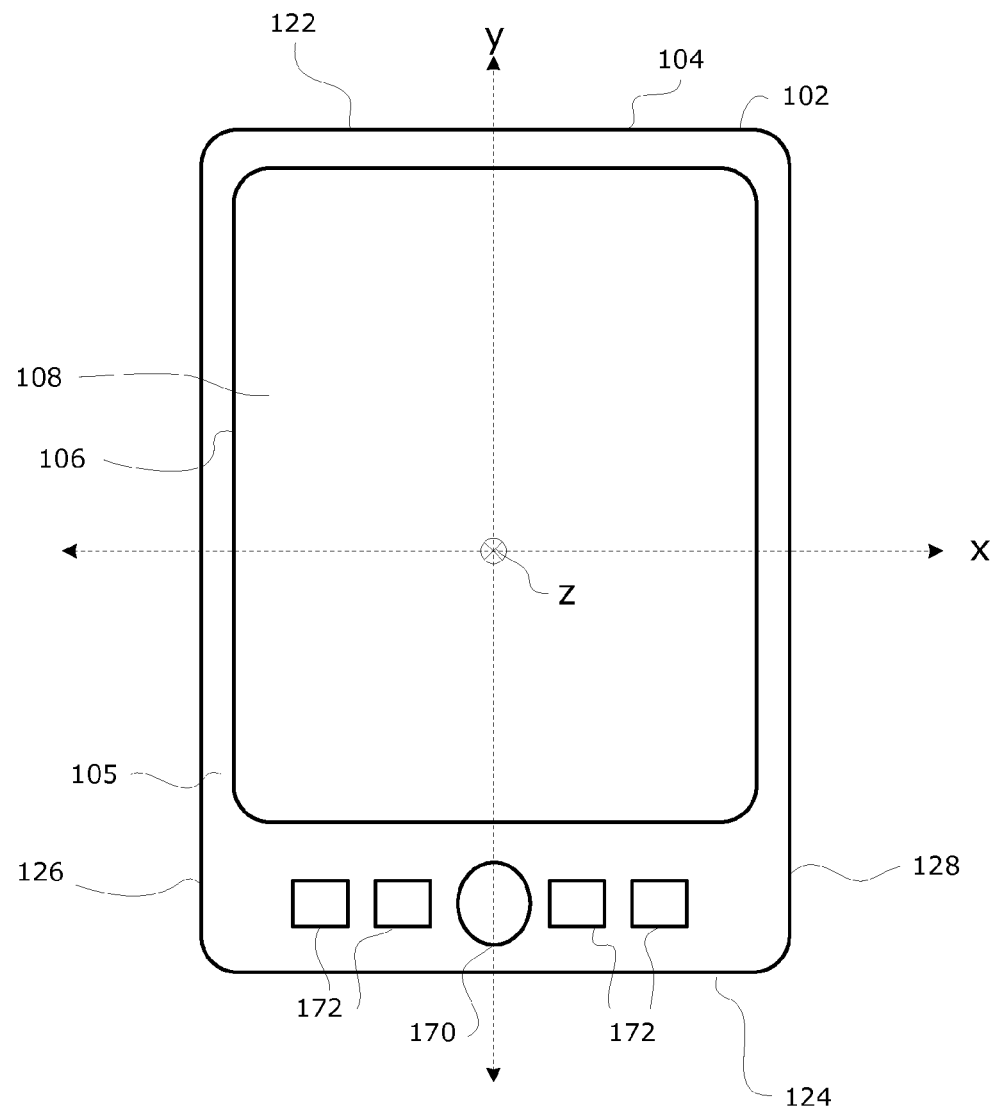
FIG. 15A is a front view of a handheld electronic device showing sensing axes of an accelerometer in accordance with one embodiment of the present disclosure.
Figure 15B:
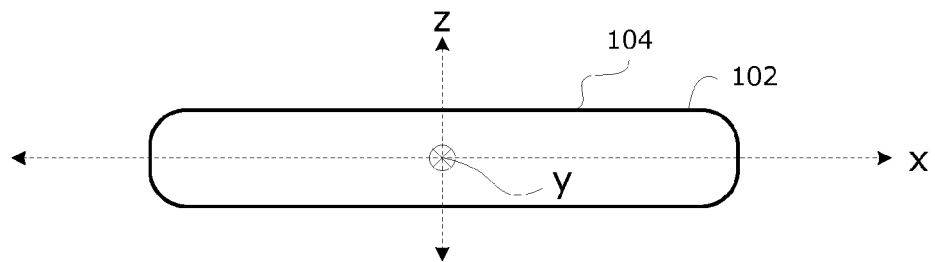
FIG. 15B is a top view of the handheld electronic device of FIG. 15A.

Referring to FIGS. 15A and 15B, the alignment of the "x", "y" and "z" axes of the accelerometer with axes of the handheld electronic device 102 in accordance with one embodiment of the present disclosure is shown. The x-axis is aligned about an axis extending laterally along the midpoint of the device 102 between the top and bottom ends 122, 124. The y-axis is aligned about an axis extending longitudinally along the midpoint of the device 102 between the left and right sides 126, 128. The z-axis extends perpendicularly through the x-y plane defined by the x and y axes at the intersection (origin) of these axes. It is contemplated that the "x", "y" and "z" axes may be aligned with different features of the handheld electronic device 102 in other embodiments.

As shown in FIG. 12A, if the handheld electronic device 102 is positioned horizontal (level with the ground), the z-axis measures 1 g in the z-axis. When the handheld electronic device 102 is tilted away from the horizontal, the z-axis baseline reading is moved downwards away from 1 g level. As shown in FIG. 12B, pitch ($\phi$) is the angle of the x-axis relative to the ground. $\theta$ is the angle of the z-axis relative to gravity. As shown in FIG. 12C, roll ($\rho$) is the angle of the y-axis relative to the ground. It will be appreciated that rotation may occur about any combination of sensing axes. The concepts and methodology described herein can be applied to any orientation and any combination of pitch (φ), roll (ρ) angles, and θ (the angle of the z-axis relative to gravity).

Figure 8:
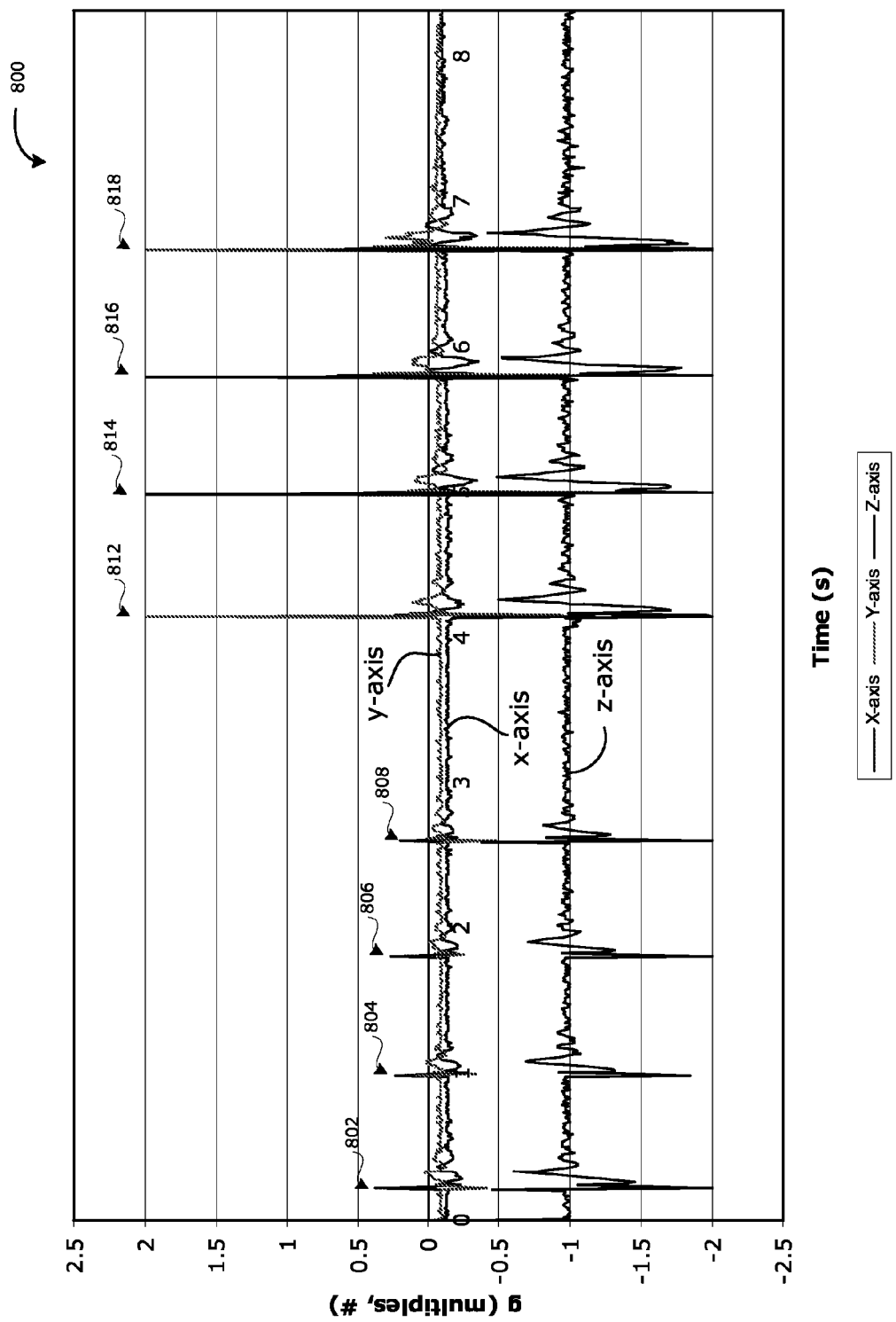
FIG. 8 is a graph illustrating example responses of a three-axis accelerometer used in a motion detection subsystem in accordance with one example embodiment of the present disclosure.

FIG. 11 illustrates the difference between an accelerometer response due to changing the orientation or "tilt" of the handheld electronic device 102 and an accelerometer response due to a tap response on the touchscreen display 106 of the handheld electronic device 102 as shown in FIGS. 7 and 8. The response shown in FIG. 11 was obtained from a model LISLV02DQ +/−2 g 3-axis accelerometer from ST Microelectronics lifted from rest at the horizontal position where the x-axis and y-axis read approximately 0 g, and where the z-axis reads approximately 1 g to the vertical position. As shown in FIG. 11, the z-axis changes from 1 g to 0 g, whereas the x-axis changes from 0 g to 1 g, while the y-axis remains at 0 g. The tilt effect on each measurement axis is different due to its relative position at the start and stop of the tilt; however, it can be seen that tilting the handheld electronic device 102 from the horizontal causes a gradual change in the reading of the sensing axes of the accelerometer rather than first and second response peaks indicative of a tap response as shown in FIGS. 7 and 8.

Referring again to the circuit 600 of FIG. 6, the bandpass filter 606 is configured to remove the component of the motion signal due to tilt (the DC component). This is also referred to as removing the static gravity offset. If the bandpass filter 606 is configured to remove the signal component which is less than approximately 50 Hz and greater than approximately 5 kHz, this should remove most or all of the tilt effect from the motion signal so that the "filtered" motion signal passing to the PIC 608 is the component of the motion signal due to normal or hard taps (AC component) on the handheld electronic device 102. The range of the bandpass filter 606 may vary, depending on the implementation. The bandpass filter 606 provides a mechanism for AC coupling—a technique which removes the static (DC) components from an input signal leaving only the components of the signal that vary with time. It will be appreciated that other digital circuits and digital circuits components for providing AC coupling may also be used to remove the tilt component.

Pitch (φ), roll (ρ), the angle of the z-axis relative to gravity (θ) angles of a three-axis accelerometer 602 may be calculated based on unfiltered motion signals (non-AC coupled signal) using equations (3), (4) and (5):

$$\varphi = \arctan \frac{x_{accel}}{\sqrt{y_{accel}^2 + z_{accel}^2}} \quad (3)$$

$$\rho = \arctan \frac{y_{accel}}{\sqrt{x_{accel}^2 + z_{accel}^2}} \quad (4)$$

$$\theta = \arctan \frac{\sqrt{x_{accel}^2 + y_{accel}^2}}{z_{accel}} \quad (5)$$

where $x_{accel}$, $y_{accel}$ and $z_{accel}$ are the unfiltered measurements from the x, y and z-axes of the three-axis accelerometer 602. It will be appreciated that pitch (φ), roll (ρ) and angle of the z-axis relative to gravity (θ) can also be accelerometer by other means.

In some embodiments, the z-axis of the accelerometer may be used to determine a face up or face down value corresponding to whether the front face 105 of the handheld electronic device 102 is directed upwards (face up) or downwards (face down). In some embodiments, determining whether the device 102 is face down of face down comprises determining whether the positive direction of the z-axis is directed upwards (face up) or downwards (face down).

Alternatively, in some embodiments the input to the bandpass filter 606 from the Amps 605 may be split so that the PIC 608 receives an unfiltered motion signal. The PIC 608 can then determine the tilt of the accelerometer 602 and/or handheld electronic device 102 using internal software. The PIC 608 can then be used to determine the amount tilt on each sensing axis as difference between the filtered and unfiltered motion signals from the sensor 602.

The motion detection subsystem 249 of FIG. 2 can be used with motion sensors other than accelerometers. The example circuits for the motion detection subsystem 249 which have been described may be adapted for such other motion sensors 249. In some embodiments, the motion detection subsystem 249 has low quiescent power draw characteristics. Low quiescent power draw characteristics result in lower power consumption when the motion detection subsystem 249 is not active, thereby preserving the battery power of the handheld electronic device 102. It will also be appreciated that other motion sensor management circuits known in the art may be used, as appropriate. In other embodiments, additional circuits may be implemented to provide additional power saving features.

Referring to FIG. 8, a graph 800 illustrating example measurements of a model LIS331DL accelerometer from STMicroelectronics N.V. will be described for the purpose of illustration. The model LIS331DL accelerometer is a three-axis (x, y, and z-axis) ±2 g/±8 g digital accelerometer having dynamically selectable full scales of ±2 g/±8 g and is capable of measuring accelerations with an output data rate of 100 Hz or 400 Hz, in which sampling data is output in 8 bits using an internal ADC. The graph 800 illustrates example measurements taken using a ±2 g scale and a 100 Hz data sampling rate for approximately 8.31 seconds. While an output data rate of 100 or 400 Hz is workable, faster sampling rates improve performance. A digital accelerometer having an output data rate of 1 kHz and better may be used once such devices become commercially available.

The first four reading peaks 802, 804, 806 and 808 correspond to a normal, softer strike force representing normal typing on a touchscreen display 106, whereas the last four reading peaks 812, 814, 816 and 818 correspond to a harder, increased strike force representing a hard tap on a touchscreen display 106. The reading peaks 802 to 818 each indicate a first forward acceleration following by a subsequent deceleration for each tap.

During the example measurements, the accelerometer and circuit board to which it was mounted was held at or close to the horizontal, but upside down, so the z-axis output has a normal output or baseline (i.e., with no tapping or pressing) of approximately −1 g representing a downward acceleration. The x-axis and y-axis outputs have a normal outputs or baselines of approximately 0 g representing no horizontal acceleration. If the accelerometer was held right side-up, the x and y axes would have a normal outputs or baselines of approximately 0 g readings and the z-axis would have a normal output or baseline of approximately 1 g if the handheld electronic device 102 was positioned horizontally, e.g. lying flat and without tapping or pressing. Although the graph 800 represents measurements taken with an example digital accelerometer at a ±2 g scale, other scales such as a ±8 g scale, and other digital and/or analog accelerometers may be used.

It will be appreciated that, based on the foregoing disclosure, motion detected by the motion detection subsystem 249 may be determined to logically correspond to a hard tap or normal tap using one or more characteristics of the motion signal, such the magnitude of the motion signal at one or more points in time, the duration at which the motion signal reaches various magnitude (e.g., the response peaks), and the timing between the magnitudes (e.g., the response peaks). Depending on the embodiment, the motion signal may be determined to logically correspond to a hard tap or normal tap in accordance with: (1) whether the magnitude of the motion signal exceeds a predetermined threshold (e.g. one of the upper and lower limit thresholds described above); (2) whether the magnitude of the motion signal exceeds a predetermined threshold for a predetermined duration; (3) whether the magnitude of the motion signal exceeds both an upper and lower threshold; (4) whether the magnitude of the motion signal exceeds both the upper and lower limit threshold for respective predetermined durations; and (5) whether the magnitude of the motion signal exceeds both an upper and lower threshold for a predetermined duration and whether the duration between when the upper and lower limits are exceeded is within a predetermined duration of each other (e.g. the zero-crossing slope between the upper and lower limit being exceed). The motion detected by the motion detection subsystem 249 is determined to be hard tap or normal tap (or possibly no tap) based whether the applicable criteria is satisfied and when the touch input signal from the touchscreen display is received within a predetermined duration of the motion signal.

Input Selection Mode

In accordance with embodiments of the present disclosure, among the software modules 221 resident on the handheld electronic device 102 is a virtual keyboard module 226. The virtual keyboard module 226 includes instructions for execution by processor 240 to implement a keyboard mode in which a virtual keyboard 134 is displayed as a user interface element on the touchscreen display 106 for receiving user input via the touch-sensitive input surface 108. In various embodiments, the virtual keyboard module 226 may, among other things, be a stand-alone software application 222, a part of the operating system 223, or part of another software application 222. In some embodiments, the functions performed by the virtual keyboard module 226 may be broken up among different software modules, rather than integrated into a single module. Furthermore, in some embodiments, at least some of the functions performed by the virtual keyboard module 226 may be implemented in firmware of the handheld electronic device 102.

Figure 9:
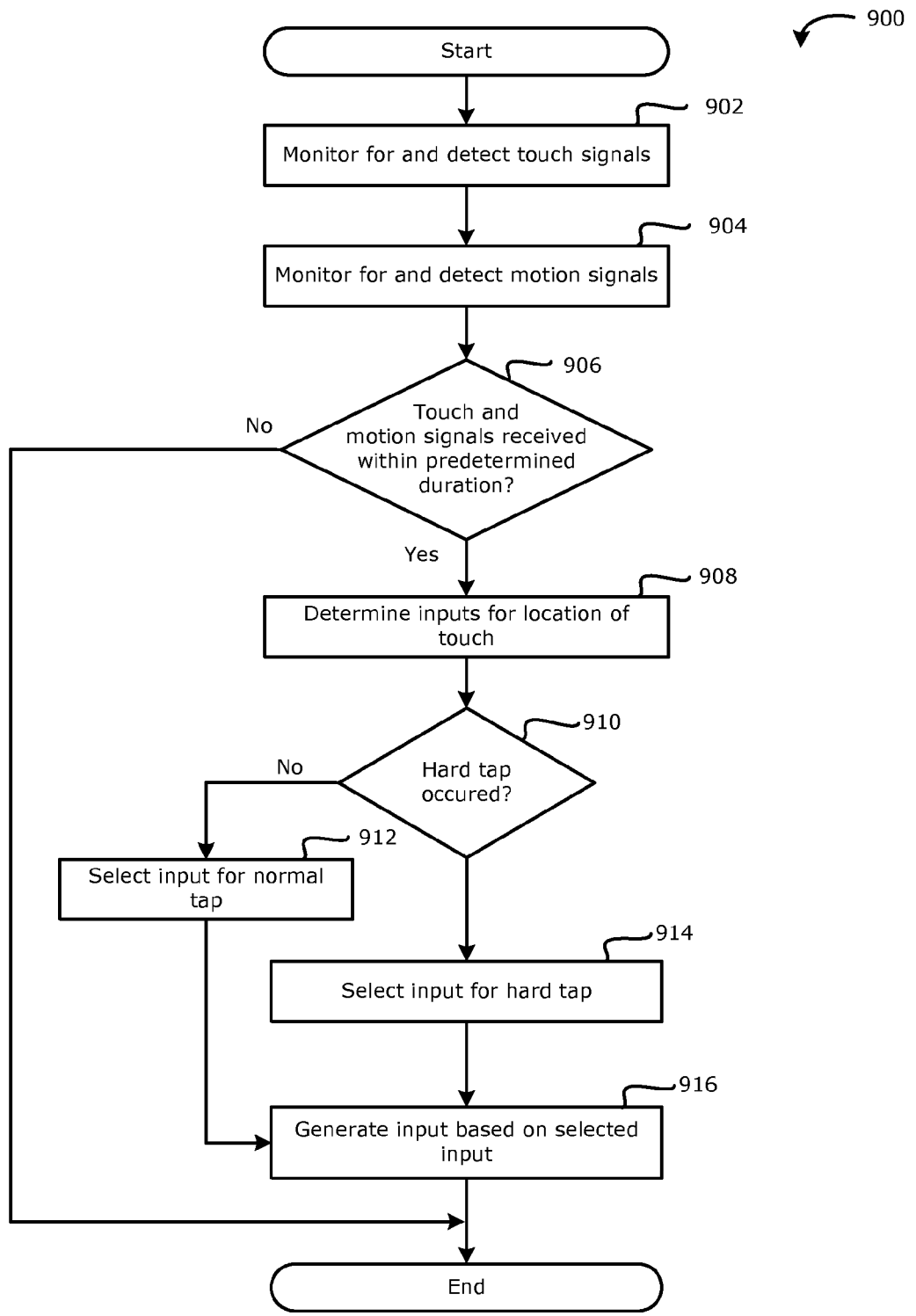
FIG. 9 is a flowchart illustrating example operations for selecting an input using a touchscreen of a handheld electronic device in accordance with one example embodiment of the present disclosure.

Reference is now made to FIG. 9 which illustrates example operations 900 for selecting an input (e.g., to display a character on the display screen 242 or to perform an executable action) from two or more inputs using the touchscreen display 106 of the handheld electronic device 102 in accordance with one embodiment of the present disclosure. In this example embodiment, the operations 900 are carried out by the processor 240 of the handheld electronic device 102 under the instruction of the virtual keyboard module 226. However, the method of selecting an input using touchscreen display 106 described in the present disclosure is not limited to virtual keyboards and may be used to select an input from multiple inputs associated with a location on the touchscreen display 106 in other contexts and input modes.

The operations 900 are used when selecting an input of key 136 in a virtual keyboard 134 displayed on the touchscreen display 106 of the handheld electronic device 102. The virtual keyboard module 226 configures the processor 240 to monitor for and detect the occurrence of touch input signals from the touchscreen display 106 and motion signals from the motion detection subsystem 249 and use these signals in selecting an input from the two or more inputs. The following paragraphs set out example input selection events according to some example embodiments.

In the first step 902, the processor 240 monitors for and detects touch input signals received from the touchscreen display 106. A touch input signal is generated by the touchscreen display 106 in response to detection of a tap or other external force on its touch-sensitive input surface 108. The touch input signal is transmitted from the touchscreen display 106 to the processor 240. The touch input signal may comprise information which specifies the location of the touch of the touchscreen display 106 (e.g., a centroid of the contact area), or raw data from which the location can be determined. The processor 240 is configured to determine the location of a tap or other external force applied to the touch-sensitive input surface 108 in accordance with the touch input signal received from the touchscreen display 106.

Next, in step 904 the processor 240 monitors for and detects motion signals received from the motion detection subsystem 249, for example from an accelerometer of the motion detection subsystem 249, which indicates that movement of the handheld electronic device 102 has been detected. A motion signal may comprise information which specifies a magnitude of the movement of the handheld electronic device 102), or raw data from which the magnitude of the movement can be determined. Some or all of the motion signals generated by the motion detection subsystem 249 may be transmitted to the processor 240 in response to the detection of movement, depending on the embodiment.

Next, in step 906 the processor 240 determines whether the movement detected by the motion detection subsystem 249 occurred within a predetermined duration (typically measured in microseconds or a few milliseconds) from the detection of the tap or other external force on the touch-sensitive input surface 108 of the touchscreen display 106, or vice versa. This step is typically performed by comparing the time the touch input signal and motion signal are received by the processor 240 to the predetermined duration. The value of the predetermined duration is an implementation detail which depends on the time required for the touchscreen to detect a touch contact and transmit an interrupt signal to the processor 240 and, depending on the implementation, possibly the duration of a tap event window and the response time for the motion detection subsystem 249 to generate and transmit an interrupt signal to the processor 240. The time required for a capacitive touchscreen to detect a touch contact is typically about 1 millisecond or less, and the time for the touchscreen to generate an transmit an interrupt signal to the processor 240 and for that signal to be received by the processor 240 is typically about 1 millisecond or less. The tap event window is typically about 3 to 5 milliseconds. Thus, in most implementations a tap should be qualified within about 10 milliseconds or so.

Determining whether the touch input signal and motion signal are received within the predetermined duration functions as a check to ensure that the motion detected by the motion detection subsystem 249 relates to, or is caused by, the tap or other external force applied to the touch-sensitive input surface 108 of the touchscreen display 106 rather than other movement of the handheld electronic device 102. Conversely, this ensures that the touch is related to any detected movement. It will be appreciated by persons skilled in the art that the motion signal could be transmitted to and received by the processor 240 before the touch input signal even though the touch input signal has been described above as being detected before the motion signal.

If a touch input signal and a motion signal which are received by the processor 240 within the predetermined duration of each other, a tap is determined to have occurred on the touch-sensitive input surface 108 and processing proceeds to step 908. If a touch input signal and a motion signal which are received by the processor 240 within the predetermined duration of each other, no tap is determined to have occurred on the touch-sensitive input surface 108 and processing ends.

Next, in step 908 the inputs associated with the location of the tap or other external force applied to the touch-sensitive input surface 108 of the touchscreen display 106 are determined. In keyboard modes of the handheld electronic device 102 in which a virtual keyboard 134 having a number of virtual keys 136 is displayed on the display screen 242 of the touchscreen display 106, step 908 may comprise determining the inputs associated with a virtual key 136 having two or more inputs which has been tapped at the location specified by the touch input signal.

As noted above, in some embodiments the virtual key 136 may be associated with a letter character as a primary input and a number or symbol character, or a command as a secondary input. In other embodiments, the virtual key 136 may be associated with a first letter as a primary input and a second letter, number or symbol character, or a command as a secondary input. A virtual key 136 may be associated with a lower case version of a letter as a primary input, and an upper case version of the same letter as a secondary input. A virtual key 136 may also have further inputs associated with it, for example, tertiary or quaternary inputs of the key 136. In some embodiments, the further inputs may be invoked, at least in part, by tapping or holding one or more control keys (which may be mechanical keys or a virtual key 136 in the virtual keyboard 134) in combination with a virtual key 136.

Next, in step 910 the motion signal detected by the motion detection subsystem 249 is qualified to determine whether it is indicative of a hard tap on the touch-sensitive input surface 108. When the motion signal is indicative of a hard tap, operations proceed to step 914 in which an input for a hard tap is selected (e.g., when a hard tap has occurred). When the motion signal is indicative of a normal tap (e.g., when a normal tap has occurred), operations proceed to step 912 in which an input for a normal tap is selected. Depending on the embodiment, tap qualification may be performed by the controller of the motion detection subsystem 249 or by the processor 240 of the device 102. The manner in which tap qualification occurs depends on the type of motion sensor (e.g. digital or analog, its capabilities, etc.) and the configuration of the motion detection subsystem 249.

In some embodiments, determining whether a motion signal is indicative of a hard tap on the touch-sensitive input surface 108 comprises determining one or more characteristics of the motion signal and comparing the characteristics to predetermining thresholds. In at least some embodiments, this comprises comparing the magnitude of the motion signal to at least one predetermined strike force threshold. If the magnitude of the motion signal is greater than or equal to the predetermined strike force threshold, the motion detected by the motion detection subsystem 249 is indicative of a hard tap.

The predetermined strike force threshold represents the magnitude of a hard tap on the touch-sensitive input surface 108. In some embodiments, the predetermined strike force threshold may be configurable or calibrated by the device user to accommodate the device user's tapping patterns and/or preferences. In some embodiments, a predetermined strike force threshold having a value of between approximately 1.5 g to 2.5 g may be used. To detect taps within this range, an accelerometer within a measuring range of ±4 g, possibly ±8 g or more should be used. Based on limited experimentation, a predetermined strike force threshold within this range has been shown to be relatively effective at detecting hard taps over a range of device users. However, strike force thresholds which are larger or smaller than this range could be used for device users with relative harder or softer taps, respectively. In some embodiments, a predetermined strike force threshold may be 1.5 g, 2 g, or 2.5 g may be used.

In some embodiments, the predetermined strike force threshold must be exceeded for a predetermined time duration for a tap to be detected. That is, when the magnitude of the motion signal is greater than or equal to the predetermined strike force threshold for a duration which is greater than or equal to the predetermined time duration, the motion detected by the motion detection subsystem 249 is indicative of a hard tap. However, when the magnitude of the motion signal is greater than or equal to the predetermined strike force threshold for a duration which is less than the predetermined time duration, the motion detected by the motion detection subsystem 249 is not indicative of a hard tap. Based on limited experimentation, a predetermined time duration of approximately 2 to 3 milliseconds has been shown to be relatively effective at detecting hard taps over a range of device users.

In other embodiments, the processor 240 compares the magnitude of the motion signal to upper and lower predetermined strike force thresholds, and if the magnitude of the motion signal is greater than or equal to both the upper and lower predetermined strike force thresholds, the motion detected by the motion detection subsystem 249 is indicative of a hard tap. The upper threshold may be used to detect a positive acceleration peak above 0 g, and the lower threshold may be used to detect a negative acceleration peak below 0 g. In some embodiments, the upper and lower thresholds must be exceeded for a predetermined time duration for a tap to be detected. That is, if the magnitude of the motion signal is greater than or equal to the upper predetermined strike force threshold for a duration which is greater than or equal to the predetermined time duration, and the magnitude of the motion signal is greater than or equal to the lower predetermined strike force threshold for a duration which is greater than or equal to the predetermined time duration, the motion detected by the motion detection subsystem 249 is indicative of a hard tap. Otherwise, the motion detected by the motion detection subsystem 249 is not indicative of a hard tap. For example, when the duration which one or both of the upper and lower predetermined strike force thresholds is exceeded is than the predetermined time duration, the motion detected by the motion detection subsystem 249 is not indicative of a hard tap.

In other embodiments, step 910 could be omitted and the motion detection subsystem 249 qualifies motion detected by the motion sensor (e.g., accelerometer) to determine whether it is indicative of a hard tap on the touch-sensitive input surface 108 prior to generating a motion signal which is sent to the processor 240 and detected in step 904. In such embodiments, the processor 240 monitors for and detects specialized "hard tap detect" motion signals from the motion detection subsystem 249 which indicate a hard tap has occurred on the touch-sensitive input surface 108 of the touchscreen display 106. These "hard tap detect" motion signals may be interrupt signals which are sent to the processor 240 and received on designated interrupt ports of the processor 240. The "hard tap detect" motion signals may be generated by the motion detection subsystem 249 when a predetermined strike force threshold has been exceeded using an analysis similar to, or the same as, that used by the processor 240 in the foregoing description. In some embodiments, "hard tap detect" interrupt signals are generated when an upper predetermined strike force threshold has been exceeded and when a lower predetermined strike force threshold has been exceeded as described above. In some embodiments, the predetermined strike force threshold(s) must be exceeded for a predetermined time duration to generate a respective "hard tap detect" interrupt signal (e.g., to generate an interrupt to the processor 240).

Next, an input is selected from at least two inputs associated with the location of the touch input in accordance with the characteristics of the motion signal. In step 912, when the tap is determined to be a normal tap, the input associated with a normal tap is selected from the at least two inputs associated with the location of the touch input by the processor 240. The input of a normal tap may be a primary input of the virtual key 136. The input of a normal tap may be a character for display on the touchscreen display 106, or a command for execution by the processor 240. The character for display may a first letter of a two letter pair associated with the virtual key 136, an uncapitalized version of a letter associated with the virtual key 136, a number or symbol character associated with the virtual key 136. A command input causes the processor 240 to perform an executable action which could be a line feed command or other action, which may or may not be related to text entry functions.

In step 914, when the tap is determined to be a hard tap, the input associated with a hard tap is selected from the at least two inputs associated with the location of the touch input by the processor 240. The input of a hard tap may be a secondary input of the virtual key 136. In a keyboard mode, the processor 240 selects the input of the virtual key 136 in virtual keyboard 134 which is associated with a hard tap. The input of a hard tap may be a character for display on the touchscreen display 106, or a command for execution by the processor 240. The character for display may be a second letter of a two letter pair associated with the virtual key 136, capitalized version of a letter associated with the virtual key 136, a number or symbol character associated with the virtual key 136.

In some embodiments, the selection made by the processor 240 in step 912, step 914, or both, may also be based on whether a control key was also tapped prior to the virtual key 136 or whether a control key was being held while the virtual key 136 was tapped. The control key may be a mechanical key or a virtual key. One or more control keys may be used at the same time. The activation of a control key (the key being tapped prior to the virtual key 136 or being held down while the virtual key 136 was tapped) in combination with a virtual key 136 in the virtual keyboard 134 causes the processor 240 to select an alternate input associated with a hard tap or normal tap. This allows further inputs associated with the virtual key 136 such as, for example, a tertiary or quaternary input of the key 136 to be selected.

Next, in step 916 the input selected by the processor 240 in accordance is generated from the at least two inputs associated with the location of the touch input in accordance with the characteristics of the motion signal (e.g., whether the tap is a normal tap or hard tap). The nature of the generation is context-dependent on the current mode and/or active application on the device 102, but typically comprises displaying a character in the display screen 242 of the touchscreen display 106, for example in a text entry field, or performing or otherwise executing a command.

While the operations 900 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. For example, the step 908 of determining the inputs associated with the location of the tap or other external force may occur at a different stage in the operations 900 so long as it occurs after the touch detection in step 902 and before the input selection.

Input Verification Mode

In accordance with embodiments of the present disclosure, among the software modules 221 resident on the handheld electronic device 102 is an input verification module 228. The input verification module 228 includes instructions for execution by processor 240 to implement an input verification mode for verifying input received through the touch-sensitive input surface 108 of the touchscreen display 106. In various embodiments, the input verification module 228 may, among other things, be a stand-alone software application 222, a part of the operating system 222, or part of another software application 222. In some embodiments, the functions performed by the input verification module 228 may be broken up among different software modules, rather than integrated into a single module. Furthermore, in some embodiments, at least some of the functions performed by the input verification module 228 may be implemented in firmware of the handheld electronic device 102.

Figure 10:
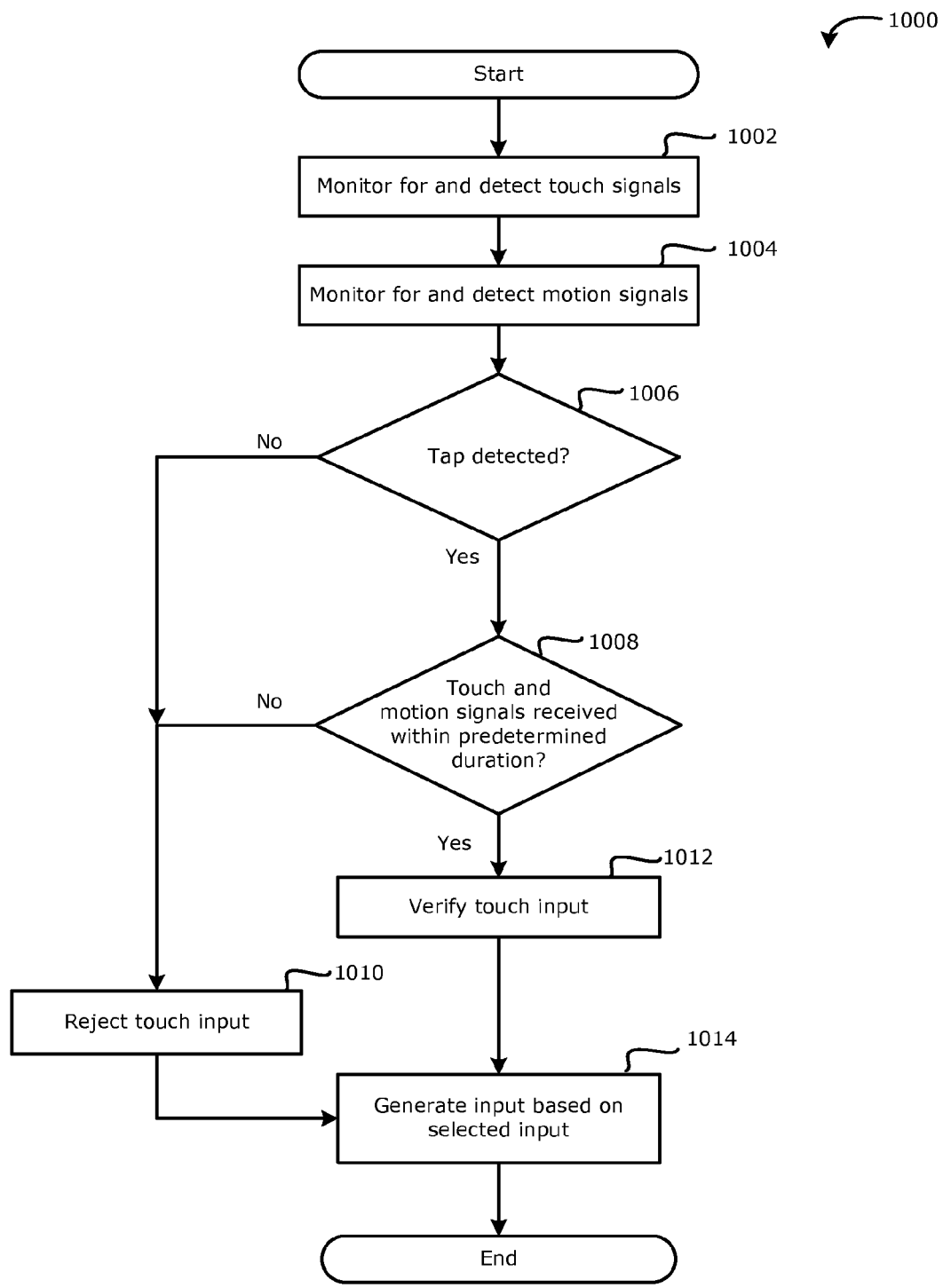
FIG. 10 is a flowchart illustrating example operations for verifying an input using a touchscreen of a handheld electronic device in accordance with one example embodiment of the present disclosure.

Reference is now made to FIG. 10 which illustrates example operations 1000 for input verification using the touchscreen display 106 of the handheld electronic device 102 in accordance with one embodiment of the present disclosure. In this example embodiment, the operations 1000 are executed by the processor 240 of the handheld electronic device 102. The operations 1000 may be used for verifying any touch input on the touchscreen display 106.

Input verification may be advantageous, amongst other applications, for use in verifying the selection of large touchscreen targets, for example, when the device user is wearing gloves and using his or her fingers for entering inputs on the touchscreen display 106 rather than a stylus or other tool. The size of the large touchscreen targets may approximate the size of a typical finger touch profile. The shape and/or size of large touchscreen targets may be changed in accordance with the device orientation (determined by an accelerometer or other sensor as described above) to match a predetermined touch profile of the device orientation (e.g., landscape or portrait). The large touchscreen targets could be virtual "Answer" or "Ignore" keys for answering or ignoring an incoming call prompt of a telephone module of the handheld electronic device 102, virtual "Snooze" or "Dismiss" keys for resetting (delaying) a calendar notification for a predetermined duration or dismissing (cancelling) a calendar notification of a calendar module of the handheld electronic device 102, or virtual "Snooze" or "Dismiss" keys for resetting (delaying) an alarm for a predetermined duration or dismissing (cancelling) an alarm of an alarm module of the handheld electronic device 102.

In example embodiments, the operations 1000 are carried out by the handheld electronic device 102 under the instruction of the input verification module 228 and possibly also the virtual keyboard module 226. The operations 1000 may be used to verify any input via the touch-sensitive input surface 108, such as selecting an input of a virtual key 136 in a virtual keyboard 134 displayed on the touchscreen display 106 of the handheld electronic device 102. The input verification module 228 configures the processor 240 to monitor for and detect the occurrence of touch input signals from the touchscreen display 106 and motion signals from the motion detection subsystem 249 and use these signals in verifying an input. The following paragraphs set out example input selection events according to some example embodiments.

In the first step 1002, the processor 240 monitors for and detects touch input signals received from the touchscreen display 106. A touch input signal is generated by the touchscreen display 106 in response to detection of a tap or other external force on its touch-sensitive input surface 108. The touch input signal is transmitted from the touchscreen display 106 to the processor 240. The touch input signal may comprise information which specifies the location of the touch of the touchscreen display 106 (e.g., a centroid of the contact area), or raw data from which the location can be determined. The processor 240 is configured to determine the location of a tap or other external force applied to the touch-sensitive input surface 108 in accordance with the touch input signal received from the touchscreen display 106.

Next, in step 1004 the processor 240 monitors for and detects motion signals received from the motion detection subsystem 249, for example from an accelerometer of the motion detection subsystem 249, which indicates that movement of the handheld electronic device 102 has been detected. A motion signal may comprise information which specifies a magnitude of the movement of the handheld electronic device 102), or raw data from which the magnitude of the movement can be determined. Some or all of the motion signals generated by the motion detection subsystem 249 may be transmitted to the processor 240 in response to the detection of movement, depending on the embodiment.

Next, the input associated with the location of the tap or other external force applied to the touch-sensitive input surface 108 of the touchscreen display 106 is determined. In keyboard modes of the handheld electronic device 102 in which a virtual keyboard 134 having a number of virtual keys 136 is displayed on the display screen 242 of the touchscreen display 106, this step may comprise determining the input associated with a virtual key 136 at the location specified by the touch input signal.

Next, in step 1006 the motion signal detected by the motion detection subsystem 249 is qualified to determine whether it is indicative of a tap on the touch-sensitive input surface 108. When the motion signal is indicative of a tap, operations proceed to step 1008. When the motion signal is not indicative of a tap, processing proceeds to step 1010 where the processor 240 determines that the touch input signal is not a valid touch input and the input associated with the location of the tap is not selected by the processor 240. In other words, the touch input signal is determined to be erroneous and the touch input signal is ignored by the processor 240. The operations 1000 then end. Depending on the embodiment, tap qualification may be performed by the controller of the motion detection subsystem 249 or by the processor 240 of the device 102 as in the operations 900 described above.

In some embodiments, determining whether a motion signal is indicative of a tap on the touch-sensitive input surface 108 comprises determining one or more characteristics of the motion signal and comparing the characteristics to predetermining thresholds. In at least some embodiments, this comprises comparing the magnitude of the motion signal to at least one predetermined strike force threshold. If the magnitude of the motion signal is greater than or equal to the predetermined strike force threshold, the motion detected by the motion detection subsystem 249 is indicative of a tap. The predetermined strike force threshold represents the magnitude of a tap on the touch-sensitive input surface 108. In some embodiments, the predetermined strike force threshold may be configurable or calibrated by the device user to accommodate the device user's tapping patterns and/or preferences.

In some embodiments, the predetermined strike force threshold must be exceeded for a predetermined time duration for a tap to be detected. That is, when the magnitude of the motion signal is greater than or equal to the predetermined strike force threshold for a duration which is greater than or equal to the predetermined time duration, the motion detected by the motion detection subsystem 249 is indicative of a tap. However, when the magnitude of the motion signal is greater than or equal to the predetermined strike force threshold for a duration which is less than the predetermined time duration, the motion detected by the motion detection subsystem 249 is not indicative of a tap. Based on limited experimentation, a predetermined time duration of approximately 2 to 3 milliseconds has been shown to be relatively effective at detecting taps over a range of device users.

In other embodiments, the processor 240 compares the magnitude of the motion signal to upper and lower predetermined strike force thresholds, and if the magnitude of the motion signal is greater than or equal to both the upper and lower predetermined strike force thresholds, the motion detected by the motion detection subsystem 249 is indicative of a tap. The upper threshold may be used to detect a positive acceleration peak above 0 g, and the lower threshold may be used to detect a negative acceleration peak below 0 g. In some embodiments, the upper and lower thresholds must be exceeded for a predetermined time duration for a tap to be detected. That is, if the magnitude of the motion signal is greater than or equal to the upper predetermined strike force threshold for a duration which is greater than or equal to the predetermined time duration, and the magnitude of the motion signal is greater than or equal to the lower predetermined strike force threshold for a duration which is greater than or equal to the predetermined time duration, the motion detected by the motion detection subsystem 249 is indicative of a tap. Otherwise, the motion detected by the motion detection subsystem 249 is not indicative of a tap. For example, when the duration which one or both of the upper and lower predetermined strike force thresholds is exceeded is than the predetermined time duration, the motion detected by the motion detection subsystem 249 is not indicative of a tap.

In other embodiments, step 1006 could be omitted and the motion detection subsystem 249 qualifies motion detected by the motion sensor (e.g., accelerometer) to determine whether it is indicative of a tap on the touch-sensitive input surface 108 prior to generating a motion signal which is sent to the processor 240 and detected in step 1004. In such embodiments, the processor 240 monitors for and detects specialized "tap detect" motion signals from the motion detection subsystem 249 which indicate a tap has occurred on the touch-sensitive input surface 108 of the touchscreen display 106. These "tap detect" motion signals may be interrupt signals which are sent to the processor 240 and received on designated interrupt ports of the processor 240. The "tap detect" motion signals may be generated by the motion detection subsystem 249 when a predetermined strike force threshold has been exceeded using an analysis similar to, or the same as, that used by the processor 240 in the foregoing description. In some embodiments, "tap detect" interrupt signals are generated when an upper predetermined strike force threshold has been exceeded and when a lower predetermined strike force threshold has been exceeded as described above. In some embodiments, the predetermined strike force threshold(s) must be exceeded for a predetermined time duration to generate a respective "tap detect" interrupt signal (e.g., to generate an interrupt to the processor 240).

Next, in step 1008 the processor 240 determines whether the movement detected by the motion detection subsystem 249 occurred within a predetermined duration (typically measured in microseconds or a few milliseconds) from the detection of the tap or other external force on the touch-sensitive input surface 108 of the touchscreen display 106, or vice versa. This step is typically performed by comparing the time the touch input signal and motion signal are received by the processor 240 to the predetermined duration. The value of the predetermined duration is an implementation detail which depends on the time required for the touchscreen to detect a touch contact and transmit an interrupt signal to the processor 240 and, depending on the implementation, possibly the duration of a tap event window and the response time for the motion detection subsystem 249 to generate and transmit an interrupt signal to the processor 240. The time required for a capacitive touchscreen to detect a touch contact is typically about 1 millisecond or less, and the time for the touchscreen to generate an transmit an interrupt signal to the processor 240 and for that signal to be received by the processor 240 is typically about 1 millisecond or less. The tap event window is typically about 3 to 5 milliseconds. Thus, in most implementations a tap should be qualified within about 10 milliseconds or so.

Determining whether the touch input signal and motion signal are received within the predetermined duration functions as a check to ensure that the motion detected by the motion detection subsystem 249 relates to, or is caused by, the tap or other external force applied to the touch-sensitive input surface 108 of the touchscreen display 106 rather than other movement of the handheld electronic device 102. Conversely, this ensures that the touch is related to any detected movement. It will be appreciated by persons skilled in the art that the motion signal could be transmitted to and received by the processor 240 before the touch input signal even though the touch input signal has been described above as being detected before the motion signal.

If a touch input signal and a motion signal are not received by the processor 240 within the predetermined duration of each other, processing proceeds to step 1010 where the processor 240 rejects the touch input signal as an invalid touch input. In other words, the touch input signal is determined to be erroneous and the touch input signal is ignored by the processor 240.

If a touch input signal and a motion signal are received by the processor 240 within the predetermined duration of each other, processing proceeds to step 1012 where the processor 240 verifies that the touch input signal is a valid touch input.

and the input associated with the location of the tap or other external force applied to the touch-sensitive input surface 108 of the touchscreen display 106 is determined. The input of a tap may be, for example, a character for display on the touchscreen display 106 or a command for execution by the processor 240.

Next, in step 1014 the input associated with the location of the tap is generated by the processor 240. The nature of the generation is context-dependent on the current mode and/or active application on the device 102, but typically comprises displaying a character in the display screen 242 of the touchscreen display 106, for example in a text entry field, or performing or otherwise executing a command.

While the operations 1000 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. For example, the step of determining the input associated with the location of the tap or other external force may occur at a different stage in the operations 1000 so long as it occurs after the touch detection in step 1002 and before step 1014. For example, the input determination may occur after the touch input signal is verified in step 1012 and before 1014. This may increase operational efficiency by determining the input associated with the location of a touch input only when the touch input has been verified, thereby reducing unnecessary processing when the touch input was erroneous.

Detailed Device Construction

Referring again to FIG. 2, the components of a handheld electronic device 102 in which example embodiments of the present disclosure can be applied will now be described in further detail. As noted above, the handheld electronic device 102 is a two-way communication device having at least data and possibly also voice communication capabilities, and the capability to communicate with other computer systems, for example, via the Internet. The handheld electronic device 102 includes a wireless communication subsystem 211 for exchanging radio frequency signals with a wireless network 204 which may comprise one or more of a Wireless Wide Area Network (WWAN) and a Wireless Local Area Network (WLAN) or other suitable network arrangements. The wireless communication subsystem 211 may comprise a WWAN communication subsystem for two-way communication with the WWAN and a WLAN communication subsystem two-way communication with the WLAN. In some embodiments, the handheld electronic device 102 is configured to communicate over both the WWAN and WLAN, and to roam between these networks. In some embodiments, the wireless network 204 may comprise multiple WWANs and WLANs.

The WWAN comprises a wireless network gateway (not shown) which connects the handheld electronic device 102 to the Internet, and through the Internet to a wireless connector system comprising a mobile data server. The mobile data server may be operated by an enterprise such as a corporation which allows access to a network such as an internal or enterprise network and its resources, or the mobile data server may be operated by a mobile network provider. If the mobile data server is operated by a mobile network service provider, the network may be the Internet rather than an internal or enterprise network.

The wireless network gateway provides translation and routing services between the mobile data server and the WWAN, which facilitates communication between the handheld electronic device 102 and other devices (not shown) connected, directly or indirectly, to the wireless network 204. Accordingly, communications sent via the handheld electronic device 102 are transported via the wireless network 204 to the wireless network gateway. The wireless gateway forwards the communications to the mobile data server via the Internet. Communications sent from the mobile data server are received by the wireless network gateway and transported via the wireless network to the handheld electronic device 102.

The WWAN may be implemented as a packet-based cellular network that includes a number of transceiver base stations (not shown). The WWAN may be implemented using any suitable network technology. By way of example, not limitation, the WWAN may be implemented as a packet-based wireless network that includes a number of transceiver base stations where each of the base stations provides wireless Radio Frequency (RF) coverage to a corresponding area or cell. The WWAN is typically operated by a mobile network service provider that provides subscription packages to users of the handheld electronic device 102. In some embodiments, the WWAN conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN is described as a "Wide-Area" network, that term is intended herein also to incorporate wireless Metropolitan Area Networks (WMAN) and other similar technologies for providing coordinated service wirelessly over an area larger than that covered by typical WLANs.

The WLAN 104 comprises a wireless network which, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) (not shown) that collectively provide a WLAN coverage area.

The WLAN may be a personal network of the user, an enterprise network, or a hotspot offered by an Internet service provider (ISP), a mobile network provider, or a property owner in a public or semi-public area, for example. The access points are connected to an access point (AP) interface which connects to the mobile data server directly (for example, if the access point is part of an enterprise WLAN in which the mobile data server resides), or indirectly via the Internet if the access point is a personal Wi-Fi network or Wi-Fi hotspot (in which case a mechanism for securely connecting to the mobile data server, such as a virtual private network (VPN), may be required). The AP interface provides translation and routing services between the access points and the mobile data server to facilitate communication, directly or indirectly, with the mobile data server.

It will be appreciated that the WWAN and WLAN may have coverage areas that overlap, at least partially. Typically, the coverage area of the WWAN will be much larger than the coverage area of the WLAN and may overlap all or a large percentage of the coverage area of the WLAN. The WLAN may have sole coverage in some regions that are dead spots in the WWAN. For example, some interior locations of an enterprise's buildings may be impenetrable to signals transmitted by the WWAN. Typically, the channel resources, such as bandwidth available for providing content to the handheld electronic device 102 will be greater over the WLAN than over the WWAN.

It will be appreciated that the above-described wireless network is provided for the purpose of illustration only, and that the above-described wireless network comprises one possible wireless network configuration of a multitude of possible configurations for use with the handheld electronic device 102. The different types of wireless networks 204 that may be implemented include, for example, data-centric wireless networks, voice-centric wireless networks, and dual-mode networks that can support both voice and data communications over the same physical base stations. New standards are still being defined, but it is believed that they will have similarities to the network behaviour described herein, and it will also be understood by persons skilled in the art that the embodiments described herein are intended to use any other suitable standards that are developed in the future.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 221 may be embedded or internal to the handheld electronic device 102 and a single antenna may be shared by both receiver and transmitter, as is known in the art. As will be apparent to those skilled in the field of communication, the particular design of the communication subsystem 221 depends on the wireless network 204 in which handheld electronic device 102 is intended to operate.

The handheld electronic device 102 may communicate with any one of a plurality of fixed transceiver base stations (not shown) of the wireless network 204 within its geographic coverage area. The handheld electronic device 102 may send and receive communication signals over the wireless network 204 after the required network registration or activation procedures have been completed. Signals received by the antenna 218 through the wireless network 204 are input to the receiver 214, which may perform such common receiver functions as signal amplification, frequency down conversion, filtering, channel selection, etc., as well as analog-to-digital conversion (ADC). The ADC of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog conversion (DAC), frequency up conversion, filtering, amplification, and transmission to the wireless network 204 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The handheld electronic device 102 includes a processor 240 which controls the overall operation of the handheld electronic device 102. The processor 240 interacts with communication subsystem 211 which performs communication functions. The processor 240 interacts with device subsystems such as the touch-sensitive input surface 108, display device 242 such as a liquid crystal display (LCD) screen, flash memory 244, random access memory (RAM) 246, read only memory (ROM) 248, auxiliary input/output (I/O) subsystems 250, data port 252 such as serial data port (for example, a Universal Serial Bus (USB) data port), speaker 256, microphone 258, navigation tool 170 such as a scroll wheel (thumbwheel) or trackball, short-range communication subsystem 262, and other device subsystems generally designated as 264. Some of the subsystems shown in FIG. 2 perform communication-related functions, whereas other subsystems may provide "resident" or on-device functions.

The processor 240 operates under stored program control and executes software modules 221 stored in memory such as persistent memory, for example, in the flash memory 244. The software modules 200 comprise operating system software 223, software applications 225, a virtual keyboard module 226, and an input verification module 228. Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 includes one or more of a Web browser application (i.e., for a Web-enabled mobile communication device 200), an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display device 242) according to the application.

In some embodiments, the auxiliary input/output (I/O) subsystems 250 may comprise an external communication link or interface, for example, an Ethernet connection. The handheld electronic device 102 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the handheld electronic device 102 such as receipt of an electronic communication or incoming phone call.

In some embodiments, the handheld electronic device 102 also includes a removable memory card 230 (typically comprising flash memory) and a memory card interface 232. Network access typically associated with a subscriber or user of the handheld electronic device 102 via the memory card 230, which may be a Subscriber Identity Module (SIM) card for use in a GSM network or other type of memory card for use in the relevant wireless network type. The memory card 230 is inserted in or connected to the memory card interface 232 of the handheld electronic device 102 in order to operate in conjunction with the wireless network 204.

The handheld electronic device 102 stores data 227 in an erasable persistent memory, which in one example embodiment is the flash memory 244. In various embodiments, the data 227 includes service data comprising information required by the handheld electronic device 102 to establish and maintain communication with the wireless network 204. The data 227 may also include user application data such as email messages, address book and contact information, calendar and schedule information, notepad documents, image files, and other commonly stored user information stored on the handheld electronic device 102 by its user, and other data. The data 227 stored in the persistent memory (e.g. flash memory 244) of the handheld electronic device 102 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the handheld electronic device 102 by providing for information or software downloads to the handheld electronic device 102 other than through the wireless network 204. The alternate download path may, for example, be used to load an encryption key onto the handheld electronic device 102 through a direct, reliable and trusted connection to thereby provide secure device communication.

In some embodiments, the handheld electronic device 102 is provided with a service routing application programming interface (API) which provides an application with the ability to route traffic through a serial data (i.e., USB) or Bluetooth® connection to the host computer system using standard connectivity protocols. When a user connects their handheld electronic device 102 to the host computer system via a USB cable or Bluetooth® connection, traffic that was destined for the wireless network 204 is automatically routed to the handheld electronic device 102 using the USB cable or Bluetooth® connection. Similarly, any traffic destined for the wireless network 204 is automatically sent over the USB cable Bluetooth® connection to the host computer system for processing.

The handheld electronic device 102 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the handheld electronic device 102, and the battery interface 236 provides a mechanical and electrical connection for the battery 238. The battery interface 236 is coupled to a regulator (not shown) which provides power V+ to the circuitry of the handheld electronic device 102.

The short-range communication subsystem 262 is an additional optional component which provides for communication between the handheld electronic device 102 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications will normally be installed on the handheld electronic device 102 during or after manufacture. Additional applications and/or upgrades to the operating system 223 or software applications 225 may also be loaded onto the handheld electronic device 102 through the wireless network 204, the auxiliary I/O subsystem 250, the serial port 252, the short-range communication subsystem 262, or other suitable subsystem 264 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the handheld electronic device 102 and may provide enhanced on-device functions, communication-related functions, or both. For example, secure communication applications may enable electronic commerce functions and other such financial transactions to be performed using the handheld electronic device 102.

The handheld electronic device 102 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 204. In some example embodiments, PIM data items are seamlessly combined, synchronized, and updated via the wireless network 204, with the user's corresponding data items stored and/or associated with the user's host computer system, thereby creating a mirrored host computer with respect to these data items.

The handheld electronic device 102 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the handheld electronic device 102 may also compose data items, such as email messages, for example, using the touch-sensitive input surface 108 and/or navigation tool 170 in conjunction with the display device 242 and possibly the auxiliary I/O device 250. These composed items may be transmitted through the communication subsystem 211 over the wireless network 204.

In the voice communication mode, the handheld electronic device 102 provides telephony functions and operates as a typical cellular phone. The overall operation is similar, except that the received signals would be output to the speaker 256 and signals for transmission would be generated by a transducer such as the microphone 222. The telephony functions are provided by a combination of software/firmware (i.e., the voice communication module) and hardware (i.e., the microphone 222, the speaker 256 and input devices). Alternative voice or audio I/O subsystems, such as a voice message recording subsystem, may also be implemented on the handheld electronic device 102. Although voice or audio signal output is typically accomplished primarily through the speaker 256, the display device 242 may also be used to provide an indication of the identity of a calling party, duration of a voice call, or other voice call related information.

In accordance with one embodiment of the present disclosure, there is provided a method of controlling a handheld electronic device having a touchscreen display, comprising: determining a location of a touch input on a touch-sensitive input surface of the touchscreen display; determining one or more characteristics of a motion signal of a motion sensor of the handheld electronic device; and generating an input from one of at least two inputs associated with the location of the touch input in accordance with the characteristics of the motion signal.

In some embodiments of the method of the preceding paragraph, the method comprises displaying a virtual keyboard on the touchscreen display, the virtual keyboard comprising a plurality of virtual keys at least some of which have at least two inputs associated with them; generating an input of a virtual key associated with the location of the touch input from the at least two inputs associated with the virtual key in accordance with the characteristics of the motion signal. In some embodiments, an input is generated in accordance with whether input from a virtual control button of the virtual keyboard was received prior to input from the virtual key or concurrently with the input from the virtual key. In some embodiments, the virtual control button is one of a virtual CAP key, virtual CTRL key, virtual SHIFT key or virtual ALT key.

In accordance with another embodiment of the present disclosure, there is provided a handheld electronic device, comprising: a controller for controlling the operation of the device; a touchscreen display connected to the controller and having a touch-sensitive input surface which generates a touch input signal in response to detection of an external force being applied to the touch-sensitive input surface, wherein the touch input signal has one or more characteristics representing at least a location on the touch-sensitive input surface at which the external force was detected; and a motion detection subsystem connected to the controller which generates a motion signal in response to motion of the handheld electronic device, the motion signal having one or more characteristics representing the detected motion; the controller being configured to perform the methods described herein.

In some embodiments, the motion detection subsystem is configured to determine whether the magnitude of the motion signal (and indirectly the external force) logically corresponds to a normal tap or hard tap on the touch-sensitive input surface. In other embodiments, these steps could be performed by the processor of the device.

In some embodiments, the motion detection subsystem is configured to determine whether the magnitude of the motion signal is greater than or equal to a predetermined threshold representing a hard tap, wherein the magnitude of the motion signal logically corresponds to a hard normal tap when it is greater if it is less than or equal to the predetermined threshold representing a hard tap, and the motion signal logically corresponds to a normal tap when it is less than the predetermined threshold. This magnitude of the motion signal to be compared to the predetermined threshold. In other embodiments, these steps could be performed by the processor of the device.

In some embodiments, the magnitude of the motion signal logically corresponds to a normal tap if it is less than the predetermined threshold representing a hard tap and greater than or equal to a second predetermined threshold representing a normal tap.

In some embodiments, the location of the touch input is determined in accordance with a touch input signal of the touch-sensitive input surface. The location may be a centroid of the contact area, as described above.

In some embodiments, the predetermined threshold representing a hard tap is calibrate-able in accordance with an average value of motion signals detected over a predetermined period of time.

In some embodiments, the motion detection subsystem comprises an accelerometer.

In some embodiments, the predetermined threshold representing a hard tap is configurable. In embodiments utilizing a second predetermined threshold representing a normal tap, the second predetermined threshold representing a hard tap is configurable.

In some embodiments, the touch-sensitive input surface defines a viewing area and wherein the touch-sensitive input surface overlays a display device.

In some embodiments, the device further comprises a rigid case which constrains the touchscreen display.

In accordance with a further embodiment of the present disclosure, there is provided a computer program product comprising a computer readable medium having stored thereon computer program instructions for implementing a method on a handheld electronic device of controlling the operation of the device using a touchscreen display, the computer executable instructions comprising instructions for performing the methods described herein.

In accordance with a further embodiment of the present disclosure, there is provided a method of verifying input using a touchscreen display of a handheld electronic device, comprising: detecting a touch input on a touch-sensitive input surface of the touchscreen display; detecting a motion signal of a motion sensor of the handheld electronic device having one or more characteristics; verifying the touch input when the characteristics of the motion signal logically correspond to a tap and generating an input associated with a location of the touch input; and rejecting the touch input when the characteristics of the motion signal do not logically correspond to a tap.

In some embodiments, the characteristics of the motion signal comprise the magnitude of the motion signal, the method comprising determining whether the magnitude of the motion signal logically corresponds to a tap including determining whether the magnitude of the motion signal is greater than or equal to a predetermined threshold representing a tap, wherein the motion signal logically corresponds to a tap when it is greater than or equal to the predetermined threshold and the motion signal does not logically correspond to a tap when it is less than the predetermined threshold.

In some embodiments, the motion signal is generated in response to an external force applied to the touch-sensitive input surface which generates the touch input, wherein the verifying is dependent on the motion signal and touch input being detected within a predetermined duration of each other.

In accordance with a further embodiment of the present disclosure, there is provided a handheld electronic device, comprising: a controller for controlling the operation of the device; a touchscreen display connected to the controller and having a touch-sensitive input surface which generates a touch input signal in response to detection of an external force being applied to the touch-sensitive input surface, wherein the touch input signal has one or more characteristics representing at least a location on the touch-sensitive input surface at which the external force was detected; and a motion detection subsystem connected to the controller which generates a motion signal in response to motion of the handheld electronic device, the motion signal having one or more characteristics representing the detected motion; the controller being configured to perform the method of verifying input described herein.

In accordance with a further embodiment of the present disclosure, there is provided a computer program product comprising a computer readable medium having stored thereon computer program instructions for implementing a method on a handheld electronic device of verifying input using a touchscreen display, the computer executable instructions comprising instructions for performing the methods described herein.

While the foregoing description has largely been described in the context of individual touch input signals and motion signals in the context of a signal tap or touch event, it will be appreciated that the teachings of the present disclosure are equally applicable to touchscreens which generate a number of touch input signals which describe a single touch event, and to motion detection subsystems which generate a number of motion signals which describe a detected movement of the device. In such cases, the group of touch input signals and/or group of motions signals, as the case may be, are analyzed in accordance with the motion data (e.g., acceleration data of the accelerometer) defined by the group(s) of signals in the same manner as described above for a single signal.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for tap detection on a handheld electronic device, comprising: measuring acceleration using an accelerometer of the handheld electronic device;
   determining when a measured first acceleration peak response exceeds an upper limit threshold followed by a measured second acceleration peak response in the opposite direction exceeding a lower limit threshold within a predetermined duration of each other;
   when both the upper limit threshold and the lower limit threshold have been exceeded within the predetermined duration, determining a rate of change of acceleration between the upper limit threshold and the lower limit threshold and registering a tap input when the rate of change of acceleration exceeds a predetermined tap threshold.

2. The method of claim 1, wherein the tap input is registered only when the upper limit threshold has been exceeded for a first predetermined duration.

3. The method of claim 1, wherein the tap input is registered only when the lower limit threshold has been exceeded for a second predetermined duration.

4. The method of claim 1, wherein the tap input is registered only when the upper limit threshold has been exceeded for a first predetermined duration and the lower limit threshold has been exceeded for a second predetermined duration.

5. The method of claim 1, wherein the tap input is registered when the upper limit threshold has been exceeded within a predetermined duration after which the lower limit threshold is exceeded, or when the lower limit threshold has been exceeded within a predetermined duration after which the upper limit threshold is exceeded.

6. The method of claim 1, wherein the upper limit threshold has a magnitude which is larger than the lower limit threshold in a first device orientation, and the lower limit threshold has a magnitude which is larger than the upper limit threshold in a second device orientation.

7. The method of claim 1, comprising:
detecting touch inputs on a touchscreen display of the handheld electronic device;
wherein the tap input is registered only when the upper limit threshold and lower limit threshold are exceeded within a predetermined duration from when a touch input is detected by the touchscreen display.

8. The method of claim 7, wherein the tap input is registered only when the upper limit threshold and lower limit threshold are exceeded within a predetermined duration from when a touch input corresponding to a selectable onscreen element is detected by the touchscreen display.

9. A handheld electronic device, comprising:
a processor;
an accelerometer connected to the processor for measuring acceleration;
the processor being configured for determining when a measured first acceleration peak response exceeds an upper limit threshold followed by a measured second acceleration peak response in the opposite direction exceeding a lower limit threshold within a predetermined duration, and when both the upper limit threshold and the lower limit threshold have been exceeded within the predetermined duration of each other, determining a rate of change of acceleration between the upper limit threshold and the lower limit threshold and registering a tap input when the rate of change of acceleration exceeds a predetermined tap threshold.

10. The handheld electronic device of claim 9, wherein the accelerometer is configured to send a first interrupt signal to the processor when the upper limit threshold has been exceeded for a first predetermined duration and to send a second interrupt signal to the processor when the lower limit threshold has been exceeded for a second predetermined duration.

11. The handheld electronic device of claim 10, comprising:
determining a duration between when the first and second interrupt signals are received by the processor, wherein the tap input is registered only when the duration between when the first and second interrupt signals are received by the processor is within the predetermined duration.

12. The handheld electronic device of claim 9, further comprising: a touchscreen display connected to the processor, wherein the processor is configured for registering the tap input only when the upper limit threshold and lower limit threshold are exceeded within a predetermined duration from when a touch input is detected by the touchscreen display.

13. The handheld electronic device of claim 12, wherein the processor is configured for registering the input event only when the upper limit threshold and lower limit threshold are exceeded within a predetermined duration from when a touch input corresponding to a selectable onscreen element is detected by the touchscreen display.

14. An accelerometer, comprising:
a sensing element; and
a controller connected to the sensing element;
the controller being configured for determining when a measured first acceleration peak response exceeds an upper limit threshold followed by a measured second acceleration peak response in the opposite direction exceeding a lower limit threshold within a predetermined duration, and when both the upper limit threshold and the lower limit threshold have been exceeded within the predetermined duration of each other, determining a rate of change of acceleration between the upper limit threshold and the lower limit threshold and registering a tap input when the rate of change of acceleration exceeds a predetermined tap threshold.

15. The accelerometer of claim 14, wherein the tap input is registered only when the upper limit threshold has been exceeded for a first predetermined duration.

16. The accelerometer of claim 14, wherein the tap input is registered only when the lower limit threshold has been exceeded for a second predetermined duration.

17. The accelerometer of claim 14, wherein the tap input is registered only when the upper limit threshold has been exceeded for a first predetermined duration and the lower limit threshold has been exceeded for a second predetermined duration.

18. The accelerometer of claim 14, wherein the tap input is registered when the upper limit threshold has been exceeded within a predetermined duration after which the lower limit threshold is exceeded, or when the lower limit threshold has been exceeded within a predetermined duration after which the upper limit threshold is exceeded.

19. The accelerometer of claim 14, wherein the upper limit threshold has a magnitude which is larger than the lower limit threshold in a first device orientation, and the lower limit threshold has a magnitude which is larger than the upper limit threshold in a second device orientation.

* * * * *